(12) United States Patent
Inaba et al.

(10) Patent No.: US 10,219,323 B2
(45) Date of Patent: Feb. 26, 2019

(54) CONDUCTIVE CONVECTIVE CLIMATE CONTROLLED SEAT

(71) Applicant: GENTHERM INCORPORATED, Northville, MI (US)

(72) Inventors: Masahiko Inaba, Chino Hills, CA (US); Keith Alan Lindeman, Chino, CA (US); John D. Lofy, Claremont, CA (US)

(73) Assignee: GENTHREM INCORPORATED, Northville, MI (US)

( * ) Notice: Subject to any disclaimer, the term of this patent is extended or adjusted under 35 U.S.C. 154(b) by 176 days.

(21) Appl. No.: 15/118,441

(22) PCT Filed: Feb. 13, 2015

(86) PCT No.: PCT/US2015/015927
§ 371 (c)(1),
(2) Date: Aug. 11, 2016

(87) PCT Pub. No.: WO2015/123585
PCT Pub. Date: Aug. 20, 2015

(65) Prior Publication Data
US 2017/0181225 A1 Jun. 22, 2017

Related U.S. Application Data

(60) Provisional application No. 61/940,306, filed on Feb. 14, 2014.

(51) Int. Cl.
*B60L 1/02* (2006.01)
*H05B 1/00* (2006.01)
(Continued)

(52) U.S. Cl.
CPC .............. *H05B 3/12* (2013.01); *A47C 21/042* (2013.01); *A47C 21/048* (2013.01); *B60N 2/565* (2013.01);
(Continued)

(58) Field of Classification Search
CPC ..... A47C 21/042–21/048; B60N 2/565; B60N 2/5657; B60N 2/5685; B60N 2/5692; H05B 2203/029; H05B 3/12
(Continued)

(56) References Cited

U.S. PATENT DOCUMENTS 3,136,577 A 6/1964 Richard
3,137,523 A 6/1964 Karner
(Continued)

FOREIGN PATENT DOCUMENTS

DE 102 38 552 8/2001
DE 101 15 242 10/2002
(Continued)

OTHER PUBLICATIONS

U.S. Appl. No. 15/495,787, filed Apr. 24, 2017, Steinman et al.
(Continued)

*Primary Examiner* — Sang Y Paik
(74) *Attorney, Agent, or Firm* — Knobbe, Martens, Olson & Bear, LLP

(57) ABSTRACT

A climate controlled assembly includes a support member having a first surface configured to support an occupant, a channel within the support, the channel extending from the first surface through a portion of the support, a thermoelectric device positioned within the channel, a heat exchanger conductively coupled to a first side of the thermoelectric device, the heat exchanger positioned within the channel and a flexible conductive member conductively coupled to a second side of the thermoelectric device, a portion of the
(Continued)

flexible conductive member extending along the first surface of the support member.

28 Claims, 25 Drawing Sheets

(51) Int. Cl.
    *H05B 3/12*         (2006.01)
    *B60N 2/56*         (2006.01)
    *A47C 21/04*       (2006.01)

(52) U.S. Cl.
    CPC .......... *B60N 2/5657* (2013.01); *B60N 2/5685* (2013.01); *B60N 2/5692* (2013.01); *H05B 2203/029* (2013.01)

(58) Field of Classification Search
    USPC .......................................... 219/201, 202, 217
    See application file for complete search history.

(56) References Cited

U.S. PATENT DOCUMENTS

| | | |
|---|---|---|
| 3,681,797 A | 8/1972 | Messner |
| 3,818,522 A | 6/1974 | Schuster |
| 4,413,857 A | 11/1983 | Hayashi |
| 4,567,351 A | 1/1986 | Kitagawa et al. |
| 4,671,567 A | 6/1987 | Frobose |
| 4,685,727 A | 8/1987 | Cremer et al. |
| 4,847,933 A | 7/1989 | Bedford |
| 4,923,248 A | 5/1990 | Feher |
| 5,002,336 A | 3/1991 | Feher |
| 5,077,709 A | 12/1991 | Feher |
| 5,106,161 A | 4/1992 | Meiller |
| 5,117,638 A | 6/1992 | Feher |
| 5,226,188 A | 7/1993 | Liou |
| 5,256,857 A | 10/1993 | Curhan et al. |
| 5,385,382 A | 1/1995 | Single, II et al. |
| 5,524,439 A | 6/1996 | Gallup et al. |
| 5,597,200 A | 1/1997 | Gregory et al. |
| 5,606,639 A | 2/1997 | Lehoe et al. |
| 5,626,021 A | 5/1997 | Karunasiri et al. |
| 5,850,741 A | 12/1998 | Feher |
| 5,887,304 A | 3/1999 | Von der Heyde |
| 5,921,314 A | 7/1999 | Schuller et al. |
| 5,924,766 A | 7/1999 | Esaki et al. |
| 5,927,599 A | 7/1999 | Kath |
| 5,927,817 A | 7/1999 | Ekman et al. |
| 5,934,748 A | 8/1999 | Faust et al. |
| 6,003,950 A | 12/1999 | Larsson |
| 6,019,420 A | 2/2000 | Faust et al. |
| 6,048,024 A | 4/2000 | Wallman |
| 6,059,018 A | 5/2000 | Yoshinori et al. |
| 6,062,641 A | 5/2000 | Suzuki et al. |
| 6,079,485 A | 6/2000 | Esaki et al. |
| 6,085,369 A | 7/2000 | Feher |
| 6,119,463 A | 9/2000 | Bell |
| 6,145,925 A | 11/2000 | Eksin et al. |
| 6,186,592 B1 | 2/2001 | Orizakis et al. |
| 6,189,966 B1 | 2/2001 | Faust et al. |
| 6,196,627 B1 | 3/2001 | Faust et al. |
| 6,206,465 B1 | 3/2001 | Faust et al. |
| 6,223,539 B1 | 5/2001 | Bell |
| 6,263,530 B1 | 7/2001 | Feher |
| 6,481,801 B1 | 11/2002 | Schmale |
| 6,509,704 B1 | 1/2003 | Brown |
| 6,541,737 B1 | 4/2003 | Eksin et al. |
| RE38,128 E | 6/2003 | Gallup et al. |
| 6,598,251 B2 | 7/2003 | Habboub et al. |
| 6,604,785 B2 | 8/2003 | Bargheer et al. |
| 6,606,866 B2 | 8/2003 | Bell |
| 6,619,736 B2 | 9/2003 | Stowe et al. |
| 6,626,488 B2 | 9/2003 | Pfahler |
| 6,644,735 B2 | 11/2003 | Bargheer et al. |
| 6,676,207 B2 | 1/2004 | Rauh et al. |
| 6,700,052 B2 | 3/2004 | Bell |
| 6,761,399 B2 | 7/2004 | Bargheer et al. |
| 6,786,541 B2 | 9/2004 | Haupt et al. |
| 6,786,545 B2 | 9/2004 | Bargheer et al. |
| 6,790,481 B2 | 9/2004 | Bishop et al. |
| 6,808,230 B2 | 10/2004 | Buss et al. |
| 6,828,528 B2 | 12/2004 | Stowe et al. |
| 6,841,957 B2 | 1/2005 | Brown |
| 6,855,880 B2 | 2/2005 | Feher |
| 6,857,697 B2 | 2/2005 | Brennan et al. |
| 6,892,807 B2 | 5/2005 | Fristedt et al. |
| 6,893,086 B2 | 5/2005 | Bajic et al. |
| 6,907,739 B2 | 6/2005 | Bell |
| 6,954,944 B2 | 10/2005 | Feher |
| 6,976,734 B2 | 12/2005 | Stoewe |
| 7,040,710 B2 | 5/2006 | White et al. |
| 7,070,232 B2 | 7/2006 | Minegishi et al. |
| 7,108,319 B2 | 9/2006 | Hartwich et al. |
| 7,114,771 B2 | 10/2006 | Lofy et al. |
| 7,124,593 B2 | 10/2006 | Feher |
| 7,131,689 B2 | 11/2006 | Brennan et al. |
| 7,147,279 B2 | 12/2006 | Bevan et al. |
| 7,168,758 B2 | 1/2007 | Bevan et al. |
| 7,178,344 B2 | 2/2007 | Bell |
| 7,201,441 B2 | 4/2007 | Stoewe et al. |
| 7,272,936 B2 | 9/2007 | Feher |
| 7,425,034 B2 | 9/2008 | Bajic et al. |
| 7,462,028 B2 | 12/2008 | Cherala et al. |
| 7,475,464 B2 | 1/2009 | Lofy et al. |
| 7,480,950 B2 | 1/2009 | Feher |
| 7,506,938 B2 | 3/2009 | Brennan et al. |
| 7,587,901 B2 | 9/2009 | Petrovski |
| 7,591,507 B2 | 9/2009 | Giffin et al. |
| 7,640,754 B2 | 1/2010 | Wolas |
| 7,665,803 B2 | 2/2010 | Wolas |
| 7,708,338 B2 | 5/2010 | Wolas |
| RE41,765 E | 9/2010 | Gregory et al. |
| 7,827,620 B2 | 11/2010 | Feher |
| 7,827,805 B2 | 11/2010 | Comiskey et al. |
| 7,862,113 B2 | 1/2011 | Knoll |
| 7,866,017 B2 | 1/2011 | Knoll |
| 7,877,827 B2 | 2/2011 | Marquette et al. |
| 7,937,789 B2 | 5/2011 | Feher |
| 7,963,594 B2 | 6/2011 | Wolas |
| 7,966,835 B2 | 6/2011 | Petrovski |
| 7,996,936 B2 | 8/2011 | Marquette et al. |
| 8,065,763 B2 | 11/2011 | Brykalski et al. |
| 8,104,295 B2 | 1/2012 | Lofy |
| 8,143,554 B2 | 3/2012 | Lofy |
| 8,181,290 B2 | 5/2012 | Brykalski et al. |
| 8,191,187 B2 | 6/2012 | Brykalski et al. |
| 8,222,511 B2 | 7/2012 | Lofy |
| 8,256,236 B2 | 9/2012 | Lofy |
| 8,332,975 B2 | 12/2012 | Brykalski et al. |
| 8,402,579 B2 | 3/2013 | Marquette et al. |
| 8,418,286 B2 | 4/2013 | Brykalski et al. |
| 8,434,314 B2 | 5/2013 | Comiskey et al. |
| 8,438,863 B2 | 5/2013 | Lofy |
| RE44,272 E | 6/2013 | Bell |
| 8,505,320 B2 | 8/2013 | Lofy |
| 8,516,842 B2 | 8/2013 | Petrovski |
| 8,539,624 B2 | 9/2013 | Terech et al. |
| 8,575,518 B2 | 11/2013 | Walsh |
| 8,621,687 B2 | 1/2014 | Brykalski et al. |
| 8,732,874 B2 | 5/2014 | Brykalski et al. |
| 8,777,320 B2 | 7/2014 | Stoll et al. |
| 8,782,830 B2 | 7/2014 | Brykalski et al. |
| 8,893,329 B2 | 11/2014 | Petrovksi |
| 8,969,703 B2 | 3/2015 | Makansi et al. |
| 9,105,808 B2 | 8/2015 | Petrovksi |
| 9,105,809 B2 | 8/2015 | Lofy |
| 9,121,414 B2 | 9/2015 | Lofy et al. |
| 9,125,497 B2 | 9/2015 | Brykalski et al. |
| 9,335,073 B2 | 5/2016 | Lofy |
| 9,445,524 B2 | 9/2016 | Lofy et al. |
| 9,451,723 B2 | 9/2016 | Lofy et al. |
| 9,622,588 B2 | 4/2017 | Brykalski et al. |
| 9,651,279 B2 | 5/2017 | Lofy |
| 9,662,962 B2 | 5/2017 | Steinman et al. |

(56) References Cited

U.S. PATENT DOCUMENTS

| | | |
|---|---|---|
| 9,685,599 B2 | 6/2017 | Petrovski et al. |
| 9,814,641 B2 | 11/2017 | Brykalski et al. |
| 9,989,267 B2 | 6/2018 | Brykalski et al. |
| 10,005,337 B2 | 6/2018 | Petrovski |
| 2002/0017102 A1 | 2/2002 | Bell |
| 2002/0195844 A1 | 12/2002 | Hipwell |
| 2003/0039298 A1 | 2/2003 | Eriksson et al. |
| 2003/0145380 A1 | 8/2003 | Schmid |
| 2004/0090093 A1 | 5/2004 | Kamiya et al. |
| 2004/0255364 A1 | 12/2004 | Feher |
| 2005/0067862 A1 | 3/2005 | Iqbal et al. |
| 2005/0140180 A1 | 6/2005 | Hesch |
| 2005/0202774 A1 | 9/2005 | Lipke |
| 2005/0285438 A1 | 12/2005 | Ishima et al. |
| 2006/0053529 A1 | 3/2006 | Feher |
| 2006/0087160 A1 | 4/2006 | Dong et al. |
| 2006/0137099 A1 | 6/2006 | Feher |
| 2006/0137358 A1 | 6/2006 | Feher |
| 2006/0175877 A1 | 8/2006 | Alionte et al. |
| 2006/0214480 A1 | 9/2006 | Terech |
| 2006/0244289 A1 | 11/2006 | Bedro |
| 2006/0273646 A1 | 12/2006 | Comiskey et al. |
| 2007/0069554 A1 | 3/2007 | Comiskey et al. |
| 2007/0086757 A1 | 4/2007 | Feher |
| 2007/0158981 A1 | 7/2007 | Almasi et al. |
| 2007/0200398 A1 | 8/2007 | Wolas et al. |
| 2007/0251016 A1 | 11/2007 | Feher |
| 2007/0262621 A1 | 11/2007 | Dong et al. |
| 2008/0000025 A1 | 1/2008 | Feher |
| 2008/0087316 A1 | 4/2008 | Inaba et al. |
| 2008/0164733 A1 | 7/2008 | Giffin et al. |
| 2008/0166224 A1 | 7/2008 | Giffin et al. |
| 2008/0223841 A1* | 9/2008 | Lofy ............... H05B 3/16 219/202 |
| 2009/0000031 A1 | 1/2009 | Feher |
| 2009/0026813 A1 | 1/2009 | Lofy |
| 2009/0033130 A1 | 2/2009 | Marquette et al. |
| 2009/0126110 A1 | 5/2009 | Feher |
| 2009/0211619 A1 | 8/2009 | Sharp et al. |
| 2009/0218855 A1 | 9/2009 | Wolas |
| 2011/0226751 A1 | 9/2011 | Lazanja et al. |
| 2011/0271994 A1 | 11/2011 | Gilley |
| 2012/0080911 A1 | 4/2012 | Brykalski et al. |
| 2012/0198616 A1 | 8/2012 | Makansi et al. |
| 2012/0235444 A1 | 9/2012 | Dilley et al. |
| 2012/0261399 A1 | 10/2012 | Lofy |
| 2013/0008181 A1 | 1/2013 | Makansi et al. |
| 2013/0086923 A1 | 4/2013 | Petrovski et al. |
| 2013/0097776 A1 | 4/2013 | Brykalski et al. |
| 2013/0097777 A1 | 4/2013 | Marquette et al. |
| 2013/0206852 A1 | 8/2013 | Brykalski et al. |
| 2013/0232996 A1 | 9/2013 | Goenka et al. |
| 2013/0239592 A1 | 9/2013 | Lofy |
| 2014/0026320 A1 | 1/2014 | Marquette et al. |
| 2014/0030082 A1 | 1/2014 | Helmenstein |
| 2014/0041396 A1 | 2/2014 | Makansi et al. |
| 2014/0090513 A1 | 4/2014 | Zhang et al. |
| 2014/0090829 A1 | 4/2014 | Petrovski |
| 2014/0113536 A1 | 4/2014 | Goenka et al. |
| 2014/0131343 A1 | 5/2014 | Walsh |
| 2014/0159442 A1 | 6/2014 | Helmenstein |
| 2014/0180493 A1 | 6/2014 | Csonti et al. |
| 2014/0187140 A1 | 7/2014 | Lazanja et al. |
| 2014/0194959 A1 | 7/2014 | Fries et al. |
| 2014/0237719 A1 | 8/2014 | Brykalski et al. |
| 2014/0250918 A1 | 9/2014 | Lofy |
| 2014/0256244 A1 | 9/2014 | Sakurai et al. |
| 2014/0260331 A1 | 9/2014 | Lofy et al. |
| 2014/0305625 A1 | 10/2014 | Petrovski |
| 2014/0310874 A1 | 10/2014 | Brykalski et al. |
| 2014/0338366 A1 | 11/2014 | Adldinger et al. |
| 2015/0013346 A1 | 1/2015 | Lofy |
| 2015/0121902 A1 | 5/2015 | Steinman |
| 2016/0053772 A1 | 2/2016 | Lofy et al. |
| 2016/0133817 A1 | 5/2016 | Makansi et al. |
| 2016/0152167 A1 | 6/2016 | Kozlowski |
| 2016/0304013 A1 | 10/2016 | Wolas et al. |
| 2017/0291467 A1 | 10/2017 | Steinman et al. |

FOREIGN PATENT DOCUMENTS

| | | |
|---|---|---|
| JP | 58-185952 | 10/1983 |
| JP | 04-107656 | 9/1992 |
| JP | 10-297243 | 11/1998 |
| JP | 2003-254636 | 9/2003 |
| WO | WO 02/011968 | 2/2002 |
| WO | WO 03/014634 | 2/2003 |
| WO | WO 03/051666 | 6/2003 |
| WO | WO 2007/142972 | 12/2007 |
| WO | WO 2009/036077 | 3/2009 |
| WO | WO 2010/088405 | 8/2010 |
| WO | WO 2015/085150 | 6/2015 |
| WO | WO 2015/123585 | 8/2015 |
| WO | WO 2016/130840 | 8/2016 |

OTHER PUBLICATIONS

International Preliminary Report on Patentability received in PCT Application No. PCT/US2015/015927, dated Aug. 25, 2016.

U.S. Appl. No. 14/864,704, filed Sep. 24, 2015, Terech et al.

Feher, Steve, "Thermoelectric Air Conditioned Variable Temperature Seat (VTS) & Effect Upon Vehicle Occupant Comfort, Vehicle Energy Efficiency, and Vehicle Environment Compatibility", SAE Technical Paper, Apr. 1993, pp. 341-349.

Lofy et al., "Thermoelectrics for Environmental Control in Automobiles", Proceeding of Twenty-First International Conference on Thermoelectrics (ICT 2002), 2002, pp. 471-476.

Photographs and accompanying description of climate control seat assembly system components publicly disclosed as early as Jan. 1998.

Photographs and accompanying description of a component of a climate control seat assembly system sold prior to Nov. 1, 2005.

Photographs and accompanying description of a component of a climate control seat assembly system sold prior to Dec. 20, 2003.

International Search Report and Written Opinion received in PCT Application No. PCT/US15/15927, dated May 14, 2015.

\* cited by examiner

CONDUCTIVE CONVECTIVE CLIMATE CONTROLLED SEAT

This application is the U.S. National Phase under 35 U.S.C. § 371 of International Application No. PCT/US2015/015927, filed Feb. 13, 2015, titled CONDUCTIVE CONVECTIVE CLIMATE CONTROLLED SEAT, which claims the benefit of U.S. Provisional Patent Application No. 61/940,306, filed Feb. 14, 2014, titled HYBRID CONDUCTIVE CONVECTIVE CLIMATE CONTROLLED SEAT, the entirety of each of which is hereby expressly incorporated by reference.

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This application generally relates to a climate control system, and more specifically, a climate control system with a conductive member.

Description of the Related Art

Temperature modified air for environmental control of living or working space is typically provided to relatively extensive areas, such as entire buildings, selected offices, or suites of rooms within a building. In the case of vehicles, such as automobiles, the entire vehicle is typically cooled or heated as a unit. There are many situations, however, in which more selective or restrictive air temperature modification is desirable. For example, it is often desirable to provide an individualized climate control for an occupant seat so that substantially instantaneous heating or cooling can be achieved. For example, an automotive vehicle exposed to the summer weather, where the vehicle has been parked in an unshaded area for a long period, can cause the vehicle seat to be very hot and uncomfortable for the occupant for some time after entering and using the vehicle, even with normal air conditioning. Furthermore, even with normal air-conditioning, on a hot day, the occupant's back and other pressure points may remain sweaty while seated. In the winter, it is highly desirable to have the ability to warm the seat of the occupant quickly to facilitate the occupant's comfort, especially where the normal vehicle heater is unlikely to warm the vehicle's interior as quickly.

For such reasons, there have been various types of individualized temperature control systems for vehicle seats. Such temperature control systems typically include a distribution system comprising a combination of channels and passages formed in the back and/or seat cushions of the seat. A thermal module thermally conditions the air and delivers the conditioned air to seat channels and passages. The conditioned air flows through the channels and passages to cool or heat the space adjacent the surface of the vehicle seat.

Thus, while such systems are useful, there is a continuing desire to improve temperature control apparatuses and methods for a climate control system for vehicle seats and other seating assemblies.

SUMMARY OF THE INVENTION

Accordingly, one aspect of the present application comprises a climate controlled assembly. The assembly comprises a support member having a support surface configured to support an occupant; a blower configured to draw air adjacent the support surface of the support member; a thermoelectric device disposed on the support member and including a main side and a waste side; a heat exchanger conductively coupled to the waste side of the thermoelectric device; and a conductive member conductively coupled to the main side of the thermoelectric device, at least a portion of the conductive member extending along the support surface of the support member, wherein during operation, the blower draws air adjacent the support surface at the same time the thermoelectric device cools the conductive member. In some aspects, the assembly further comprises a channel within the support member, the channel extending from the support surface through a portion of the support member, wherein the blower is configured to withdraw air adjacent the support surface of the support into the channel. In some aspects, the thermoelectric device and the heat exchanger are positioned at least partially within the channel. In some aspects, the support member is a seat for a vehicle. In some aspects, the support member is a bed. In some aspects, the conductive member is a flexible metal mesh. In some aspects, the assembly further comprises a comfort layer and a trim layer covering the support surface of the support member. In some aspects, the conductive member extends along the support surface of the support member below the comfort layer. In some aspects, the conductive member comprises a first conductive member and a second conductive member conductively coupled to the main side of the thermoelectric device. In some aspects, the assembly further comprises an intermediate member conductively coupled to the conductive member and to the main side of the thermoelectric device.

Another aspect of the present application comprises a climate controlled assembly. The assembly comprises a support member having a first surface configured to support an occupant; a channel within the support member, the channel extending from the first surface through a portion of the support; a thermoelectric device positioned within the channel; a heat exchanger conductively coupled to a first side of the thermoelectric device, the heat exchanger positioned within the channel; and at least one conductive member conductively coupled to a second side of the thermoelectric device, a portion of the conductive member extending along the first surface of the support member. In some aspects, the assembly further comprises a recess positioned within the support member between the first surface and the channel and a permeable member positioned within the recess. In some aspects, the assembly further comprises a comfort layer positioned on the first surface of the support member, wherein the at least one conductive member is positioned between the permeable member and the comfort layer. In some aspects, the assembly further comprises an insulating layer positioned between the conductive member and the first surface. In some aspects, the assembly further comprises an intermediate conductive member, wherein the at least one conductive member is coupled to the intermediate conductive member and the intermediate conductive member is coupled to the thermoelectric device.

Yet another aspect of the present application comprises a method for thermally conditioning a support assembly that includes a support structure that defines a support surface. The method comprises operating a thermoelectric device, the thermoelectric device including a main side and a waste side; drawing air from adjacent the support surface through a heat exchanger conductively coupled to the waste side of the thermoelectric device; cooling, using the thermoelectric device, a conductive member conductively coupled to the main side of the thermoelectric device and located adjacent the support surface; and conductively cooling the support surface by simultaneously performing the steps of drawing air from adjacent the support surface and cooling the conductive member. In some aspects, the conductive member is a flexible conductive member that extends along the support surface. In some aspects, the thermoelectric device is located at least partially within the support structure.

Another aspect of the present application comprises a climate control device. The device comprises a thermoelectric device having a main side and a waste side, the thermoelectric device configured to heat or cool air; a first heat exchanger defining a flow path adjacent the waste side of the thermos electric device and conductively coupled to the waste side of the thermoelectric device; and a flexible first conductive member extending beyond the thermoelectric device and conductively coupled to the main side the thermoelectric device. In some aspects, the first conductive member is a flexible woven material. In some aspects, the first conductive member is a flexible metallic material. In some aspects, a length of the first conductive member is at least 150 mm. In some aspects, a length of the first conductive member is at least 200 mm. In some aspects, a length of the first conductive member is at least 50 mm. In some aspects, a length of the first conductive member is between 50 mm and 100 mm. In some aspects, a length of the first conductive member is between 200 mm and 250 mm. In some aspects, the device further comprises an intermediate conductive member, wherein the flexible first conductive member is coupled to the intermediate conductive member and the intermediate conductive member is coupled to the thermoelectric device.

Yet another aspect of the present application comprises an apparatus for thermally conditioning a space adjacent a support assembly that includes a support structure that defines a support surface. The apparatus comprises a blower; a thermoelectric device including a main side and a waste side; a heat exchanger conductively coupled to the waste side of the thermoelectric device and defining a flow path adjacent the waste side for receiving fluid from the blower; and a flexible conductive member distanced from the thermoelectric device and conductively coupled to the main side of the thermoelectric device. In some aspects, the flexible conductive member is a flexible woven material. In some aspects, the flexible conductive member is a flexible metallic material. In some aspects, a length of the flexible conductive member is at least 150 mm. In some aspects, a length of the flexible conductive member is at least 200 mm. In some aspects, a length of the flexible conductive member is at least 50 mm. In some aspects, a length of the flexible conductive member is between 50 mm and 100 mm. In some aspects, a length of the flexible conductive member is between 200 mm and 250 mm. In some aspects, the apparatus further comprises an intermediate conductive member, wherein the flexible conductive member is coupled to the intermediate conductive member and the intermediate conductive member is coupled to the thermoelectric device.

DETAILED DESCRIPTION OF THE PREFERRED EMBODIMENTS

Figure 1:
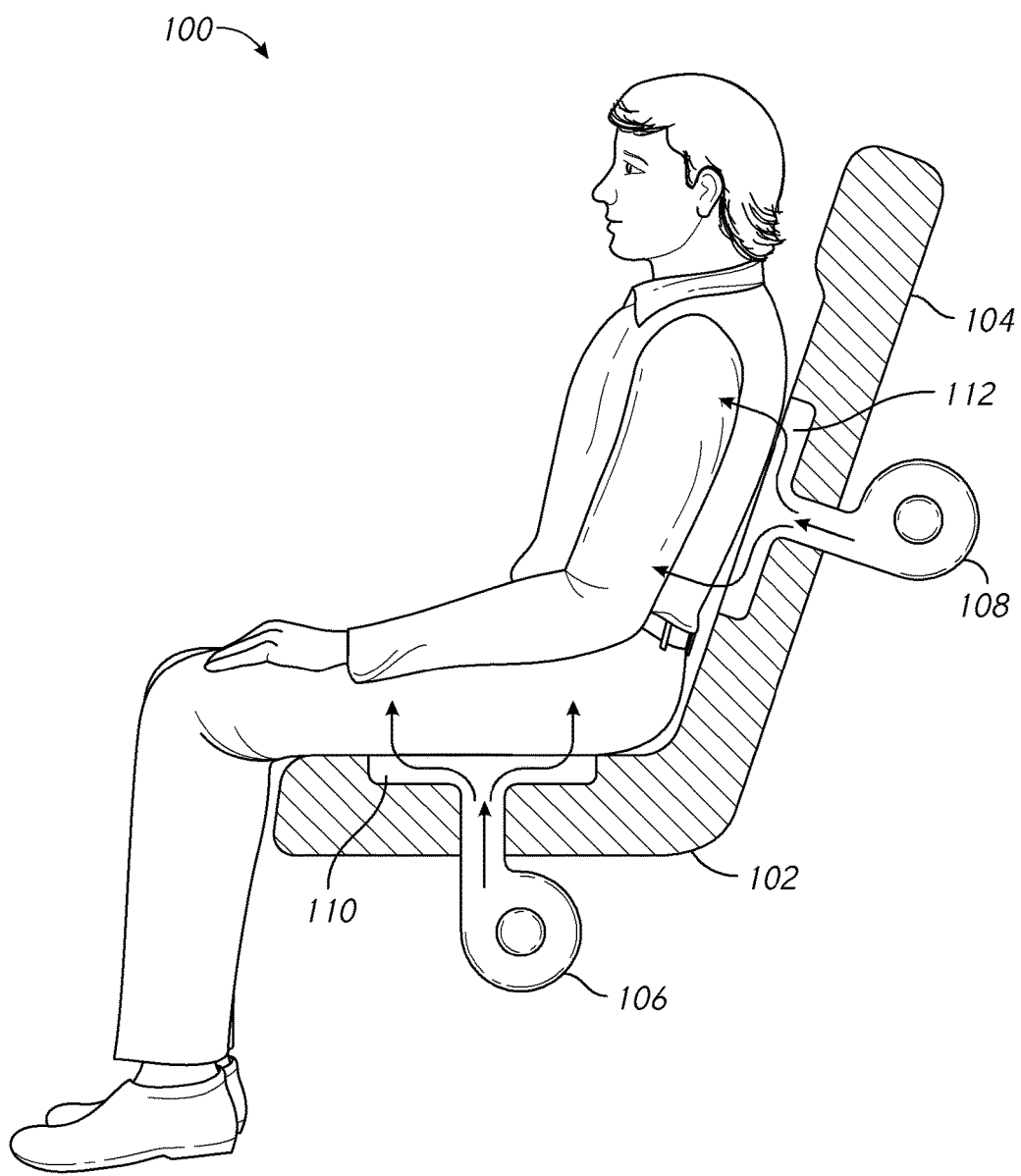
FIG. 1 is a cross-sectional side view of a push type ventilated seat system.

FIG. 1 illustrates an embodiment of a push type ventilated seat system 100. As shown in FIG. 1, the illustrated system comprises a seat portion 102 and a backrest portion 104 (shown in cross-section). The system can include a blower 106 for the seat portion 102 and a blower 108 for the backrest portion 104. The blowers 106, 108 can push air through channels 110, 112 formed in the seat. In this manner, air drawn in from the ambient cabin can be pushed through the seat to provide comfort to a passenger sitting on the seat. The blowers 110, 112 can include a thermoelectric module (e.g., as described below) for selectively providing cooled or heated air to the passenger. One possible disadvantage with a push type system is that the air received by the blower and then delivered to the thermoelectric module may be hotter than the ambient air due to the configuration of the vehicle's heating, ventilating, and air conditioning (HVAC) system and due to the inefficiencies of a blower converting electrical power to airflow power.

Figure 2:
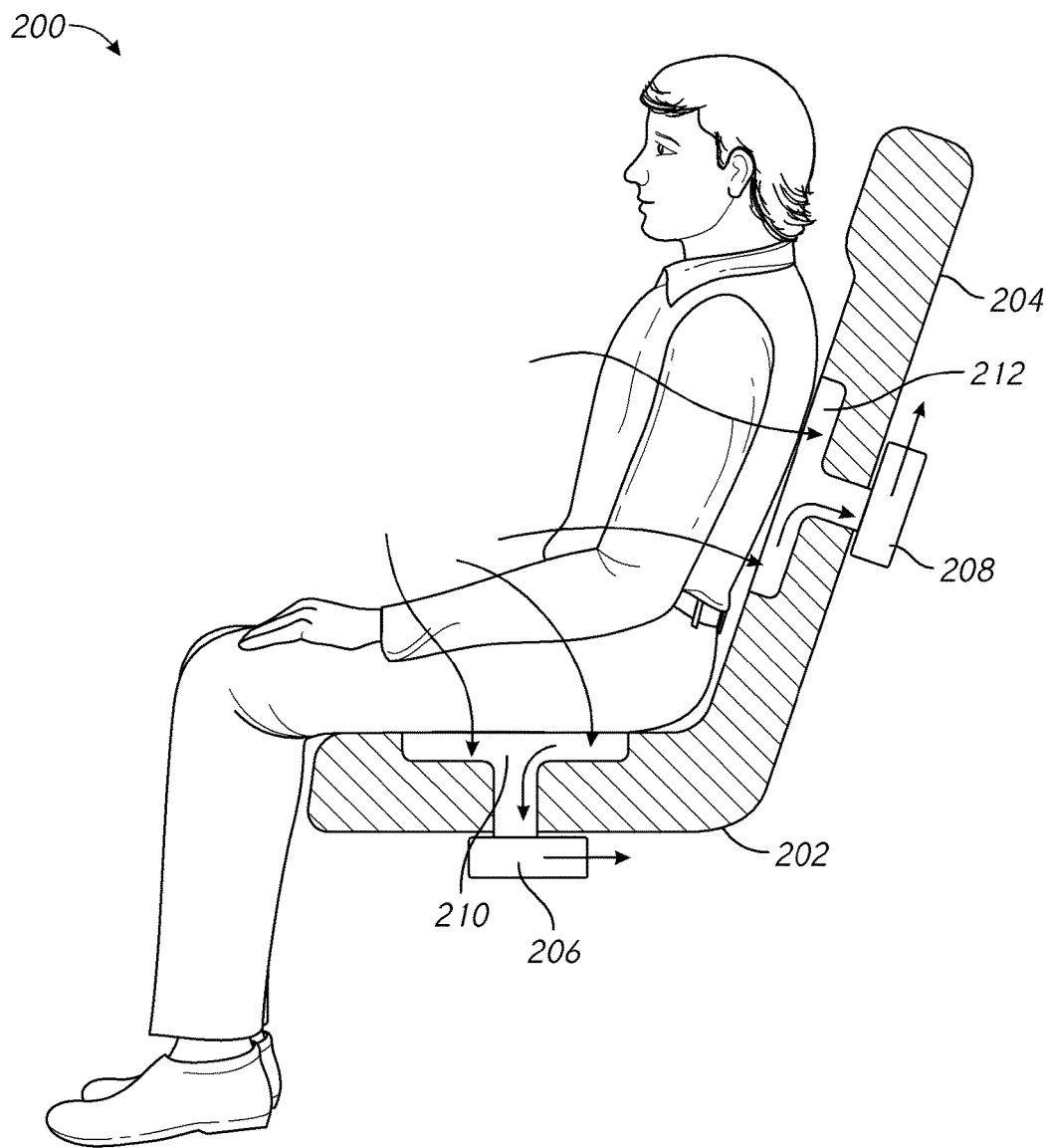
FIG. 2 is a cross-sectional side view of a pull type ventilated seat system.

FIG. 2 illustrates an embodiment of a pull type ventilated seat system 200. As shown in the FIG. 2, the illustrated pull type system 200 can comprise a seat portion 202 and a backrest portion 204 (shown in cross-section). The system 200 can include a blower 206 for the seat portion 202 and a blower 208 for the backrest portion 204. In this arrangement, the blowers 206, 208 can pull air from a top surface of the seat through channels 210, 212 formed in the seat. In this manner, air drawn in from the ambient cabin next to the seated passenger can be pulled through the seat to provide comfort to a passenger sitting on the seat. However, in this system there is no active cooling and/or heating.

Figure 3:
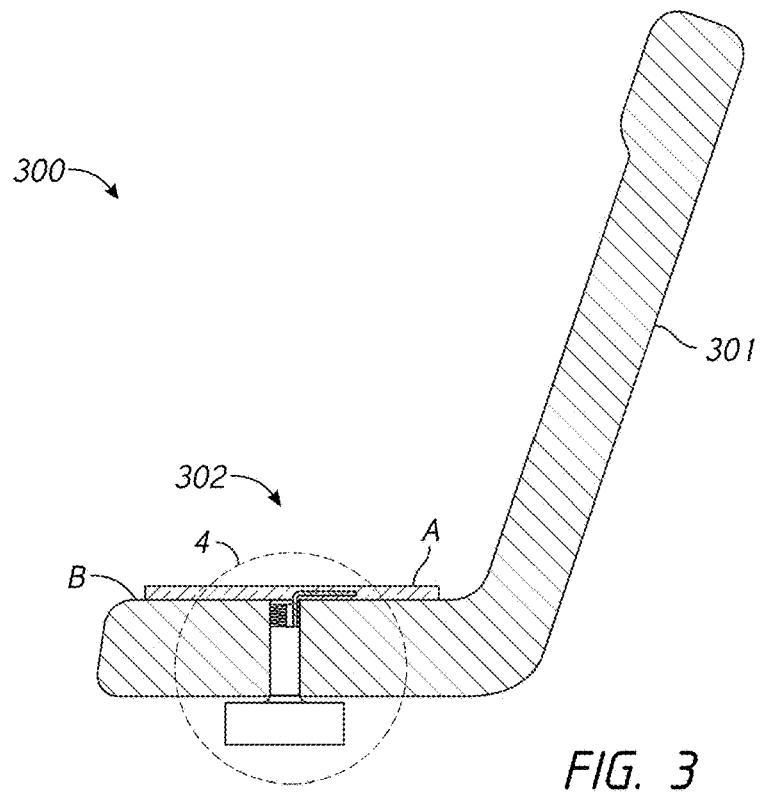
FIG. 3 is a cross-sectional side view of an embodiment hybrid seat climate control system according to the present disclosure.
Figure 4:
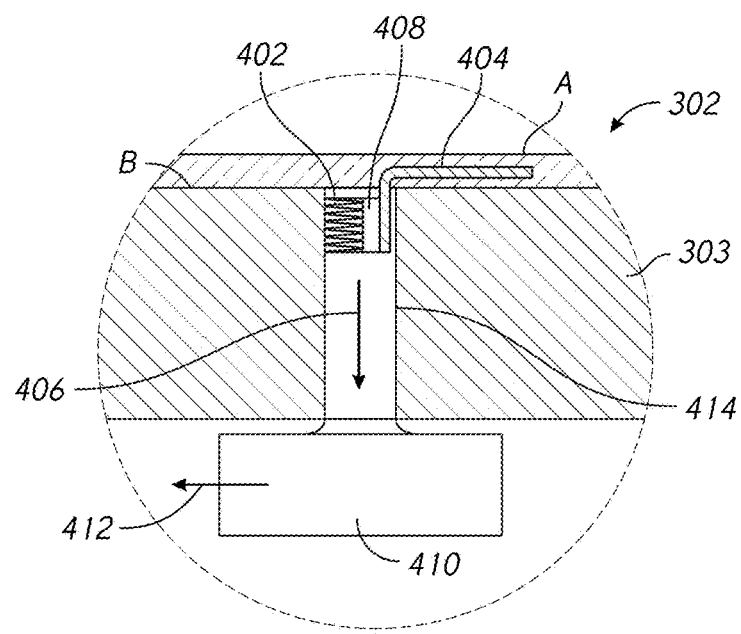
FIG. 4 is an enlarged cross-sectional side view of a portion of FIG. 3 of an embodiment hybrid seat climate control system according to the present disclosure.

FIGS. 3 and 4 illustrate an embodiment of a seat climate control system 300 employing a combination of convective and conductive thermal conditioning. In one arrangement, convective cooling is provided via a seat ventilation system or thermoelectric assembly 302 which draws or pulls air (as indicated by arrows 406 and 412) through a conditioned surface A (e.g., a "top" surface which is nearest the occupant). A blower 410 can pull air (as indicated by arrows 406 and 412) from the top surface A through channel 414 formed in the seat (shown in cross-section). Conductive cooling can be provided by a thermoelectric device or TED 408 having a flexible conductive member 404 (e.g., a braid made of conductive material) extending along the surface B that is below the outer, or conditioned, surface A. In the illustrated arrangement, the flexible conductive member 404 is positioned beneath the conditioned surface A (e.g., by placing the flexible conductive element 404 beneath the trim and/or covering of the seat and/or beneath an intermediate layer). The trim and/or covering of the seat can be leather, upholstery, or other suitable covering for a seat. In some embodiments, an intermediate layer (e.g., cushion, spacer fabric, etc.) could be located beneath the trim layer but above the conductive member. In some embodiments, as described below, the conductive member may be placed just below the top surface or integrated into the support member or cushion 303. Note that many of the following drawings the top surface is often omitted from the drawings for clarity.

When positioned below the top surface A, the flexible conductive member 404 can be positioned close enough to the top surface to provide a cooling or heating effect to the occupant through conduction. In certain embodiments, a portion of the flexible conductive member is positioned within 0.5 mm and 200 mm of the top surface. In certain embodiments, the flexible conductive 404 member can also extend along the top surface A to form part of the top surface A and/or extend partially below the top surface A and also extend partially along the top surface A. In some embodiments, heat transfer devices such as fins 402 may be placed on the waste or hot side of the thermoelectric device 408. While the illustrated embodiment shows the thermoelectric device or TED 408 positioned in a channel extending through the seat, in modified arrangements of the embodiments described herein the thermoelectric device or TED 408 can be disposed on or coupled to the support structure in a different or modified arrangement. For example, the channel can be positioned along a top surface, side or bottom surface of the seat or support structure. The thermoelectric device or TED 408 or portion thereof can be positioned in a channel positioned along a side, top or bottom surface of the seat or support structure and/or along a side, top or bottom portion of the seat or support structure.

The thermoelectric device can be a Peltier thermoelectric module, which includes a Peltier circuit. A Peltier circuit is a type of thermoelectric device that comprises two sides, each of which is either heated or cooled when current is delivered through the circuit. For example, when voltage is applied in a first direction through the thermoelectric device, one side generally generates heat while the opposite side absorbs heat (i.e., is "cooled"). The thermoelectric device can be configured so that switching the polarity of the circuit can create the opposite effect. Typically, thermoelectric devices comprise a closed circuit that includes dissimilar materials. As a DC voltage is applied across the closed circuit, a temperature change is generated at the junction of the dissimilar materials. Thus, depending on the direction that electrical current flows through the thermoelectric device, heat is either emitted or absorbed. Thermoelectric devices can include several such junctions connected electrically in series. The junctions can be sandwiched between two ceramic plates that generally form the cold side and the hot side of the device. The cold side and hot side can be thermally coupled to one or more heat transfer devices (e.g., fins, such as fins 402, or a flexible conductive member, such as member 404) that facilitate heat transfer with a volume of air or other fluid. Thus, air or other fluid can be passed through or near the cold and/or hot side of a thermoelectric device (e.g., Peltier circuit) to selectively heat and/or cool the air or other fluid. In some embodiments, a control module may be used to activate the thermoelectric device.

As shown in FIG. 4, the thermoelectric module 302 in the illustrated embodiment includes a thermoelectric device 408 (Peltier circuit). One side of the thermoelectric device 408 is coupled to a heat exchanger 404 (which can be in the form of fins), which form the "hot" or waste side of the thermoelectric device 408. The opposite side of the thermoelectric device 408 is coupled to the flexible thermally conductive member 404 (e.g., a thermally conductive flexible braid). As shown in FIG. 4, the heat exchanger 404 of the waste side of the module 408 can be positioned within a channel 414 formed in the seat 301. The channel 414, in turn, is in fluid communication with a fan or blower 410 positioned, for example, beneath the seat 301. In certain arrangements, the fan or blower 410 can be positioned closer to the thermoelectric module 302 (e.g., within the channel 414 and/or integrated with the thermometric electric module 302 (e.g., by positioning the blower near or adjacent the thermoelectric module 302 and/or within the same housing) The blower 410, in turn, can draw or pull air from the "top" surface of the seat down into the channels 414 and through the waste side heat exchanger 402. In this manner, heat is removed from the heat exchangers 402 positioned within the channels 414 while the thermally conductive flexible member 404 is cooled. If desired, the thermoelectric device 408 can be operated in "reverse" such that heat from the ambient air is absorbed by the fins 402 in the channel 414 (that is, the air flowing through the fins 402 are cooled) so as to heat the thermally conductive flexible member 404 coupled to the other side of the thermoelectric device 408.

In one embodiment, the flexible conductive member 404 comprises a copper braid and/or mesh material. However, in other embodiments, other materials could be used (e.g., aluminum, graphite and/or grapheme) and/or other configurations (e.g., non-braided configurations, thin stripes, etc.). It should also be appreciated that while the member 404 is described as being flexible portions of the flexible conductive member 404 may not be flexible. For example, in one embodiment only the portions of the flexible conductive member 404 near and/or in contact with the occupant may be flexible.

FIG. 4 and the following figures of this application show the climate control seat system 302 with combination of a convective and conductive thermal conditioning in the context of a standard automotive seat with a seat portion and a back portion. However, it should be appreciated that certain features and aspects of the climate controlled seat assembly described herein may also be used in other seat configurations and a variety of other applications and environments. For example, certain features and aspects of the combination of a convective and conductive thermal conditioning described herein may be adapted for use in other vehicles, such as, for example, an airplane, a boat, or the like. Further, certain features and aspects of combination of a convective and conductive thermal conditioning may also be adapted for use in stationary environments, such as, for example, a chair, a sofa, a theater seat, a mattress, a topper for mattress, and an office seat that is used in a place of business and/or residence. Further, certain features and aspects of combination of a convective and conductive thermal conditioning can be used in arrangements in which a space is cooled (e.g., a storage bin).

Figure 5:
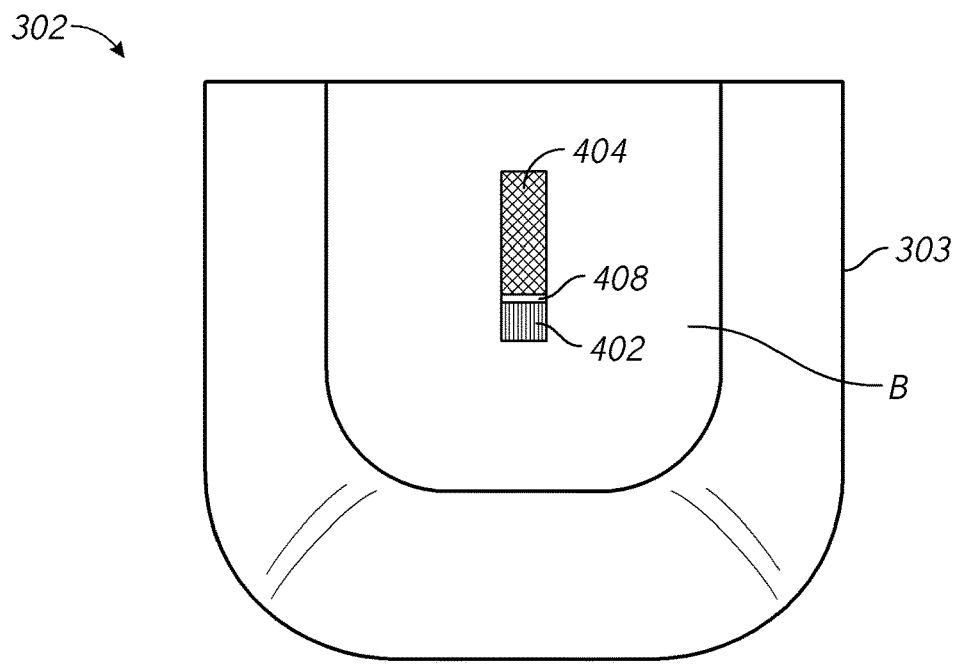
FIG. 5 is a top view of the seat climate control system of FIG. 4.
Figure 6:
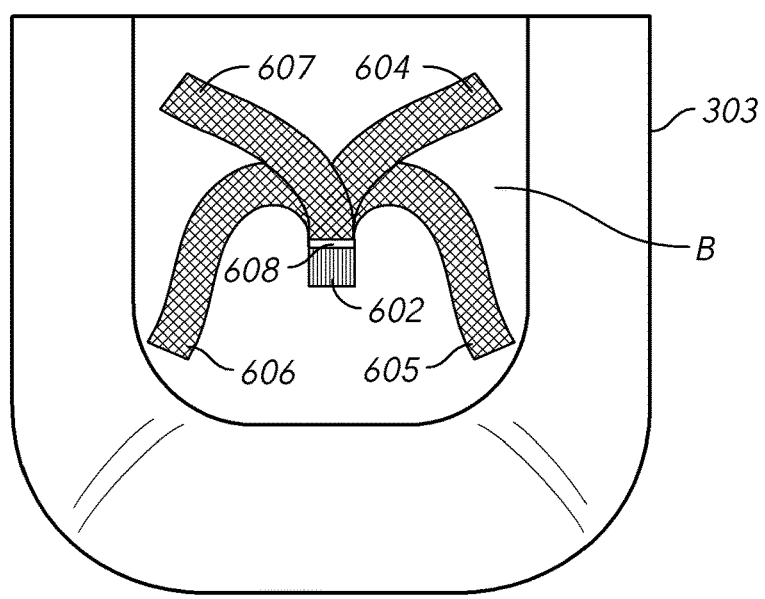
FIG. 6 is a top view of a modified embodiment of the seat climate control system of FIG. 4 according to the present disclosure.

FIG. 5 illustrates a top view of the system 302 of FIG. 4. As shown in FIG. 5, the flexible thermally conductive member 404 can extend from the channel in the seat 301 over a portion of the subsurface B of the cushion 303. FIG. 6 illustrates a modified embodiment in which four conductive members 604, 605, 606, 607 extend from the thermoelectric device 608 to cover a larger portion of the cushion 303. As described above, in certain arrangements, the conductive members and subsurface B of the cushion can be covered with a trim or top layer (e.g., a seat covering material such as upholstery, leather, cloth) and/or an intermediate layer (e.g., a spacer fabric, a comfort layer and/or an additional cushioning layer, etc.) positioned between the top layer and a seat cushion. In certain arrangements, the conductive members or portions thereof can form part of the trim or top layer and/or be positioned above the intermediate layer (if provided). The trim layer or top layer (e.g., a seat covering material such as upholstery, leather, cloth) and/or an intermediate layer can be made of air permeable material and/or can be perforated or otherwise formed with holes and/or passages for allowing the flow of air there-through such that air can flow through the trim or top later and/or the intermediate layer into the channel or channels.

Figure 7:
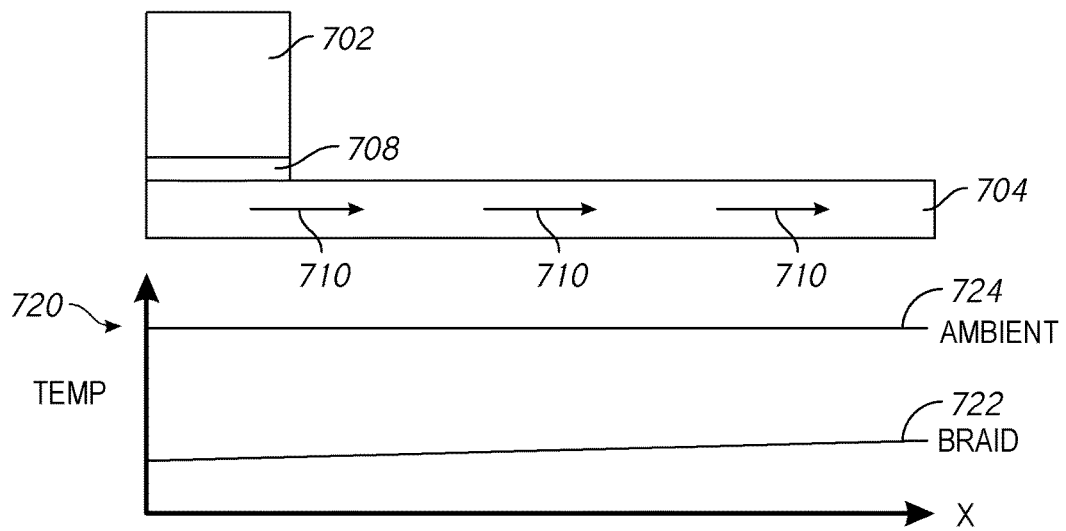
FIG. 7 is a side view of an embodiment thermoelectric device coupled to a conductive member according to the present disclosure and illustrating a temperature gradient along the conductive member.
Figure 8:
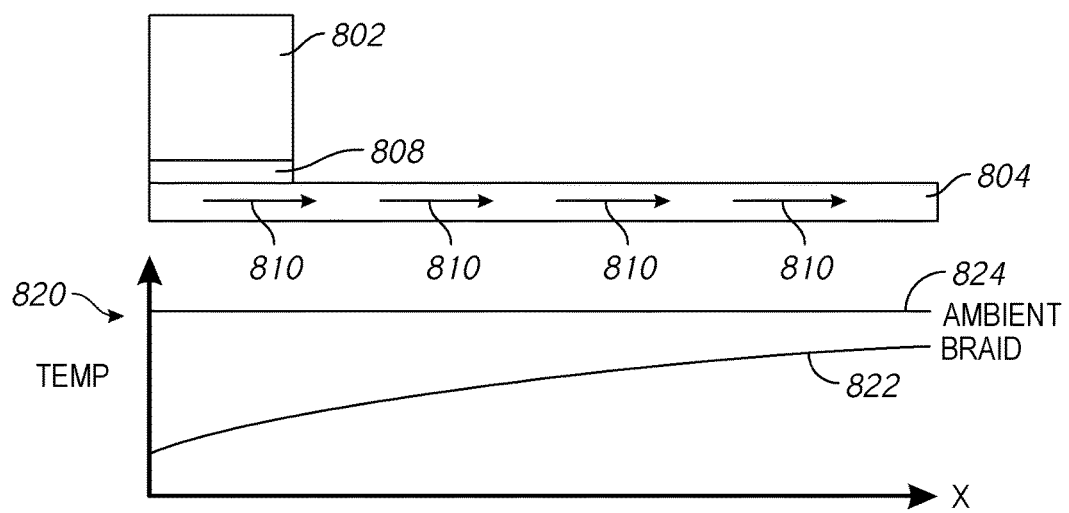
FIG. 8 is a side view of another embodiment thermoelectric device coupled to a conductive member according to the present disclosure and illustrating a temperature gradient along the conductive member.

FIGS. 7 and 8 illustrate the advantages and potential disadvantages of the thickness of the flexible conductive member. It is anticipated that, in general, a thicker conductive member will provide better conduction of temperature as compared to a thinner conductive member. However, it is anticipated that, in general, the thinner conductive member would be more flexible and provide better comfort to an occupant sitting on the seat.

As illustrated in FIG. 7, for a thick braid 704 connected to thermoelectric device 708, the thickness of the braid 704 provides good conduction of temperature throughout the braid 704, as illustrated by the arrows 710. As illustrated in the graph 720 which illustrates the temperature 722 of the braid along its length X, the temperature of the braid does not significantly change along its length, that is, the temperature of the braid near the thermoelectric device is almost the same as the temperature of the braid furthest away from the thermoelectric device and stays below the ambient temperature 724. Additionally, a user may feel the thick braid under the seat covering when sitting in the seat or may feel a distinct temperature difference at the seat surface directly over the braid versus the seat surface not covering the braid. Similar to the embodiment shown in FIG. 4, a heat exchanger 702 may be coupled to the waste side of the thermoelectric device 708.

A similar temperature graph is illustrated in FIG. 8 for a thin braid 804. As illustrated in graph 820, the temperature 822 along the braid 804 varies much more for the thin braid 804 than for the thick braid 704 shown in FIG. 7. Additionally, the temperature 822 of the braid 804 further away from the thermoelectric device 808 is higher and closer to the ambient temperature 824 than for the thick braid 704. This wider temperature gradient can create an uneven temperature feel in the seat that may be uncomfortable for the user. In addition, the overall level of cooling may be reduced. While the thin braid 804 may be more flexible and therefore lead to less of a distinct "feel" within the seat cushion, the thin braid 804 does not conduct heat as well as a thick braid, leading to an uneven temperature gradient along the braid that may be felt by the user through the seat cushion. Similar to the embodiment shown in FIG. 4, a heat exchanger 802 may be coupled to the waste side of the thermoelectric device 808.

Figure 9:
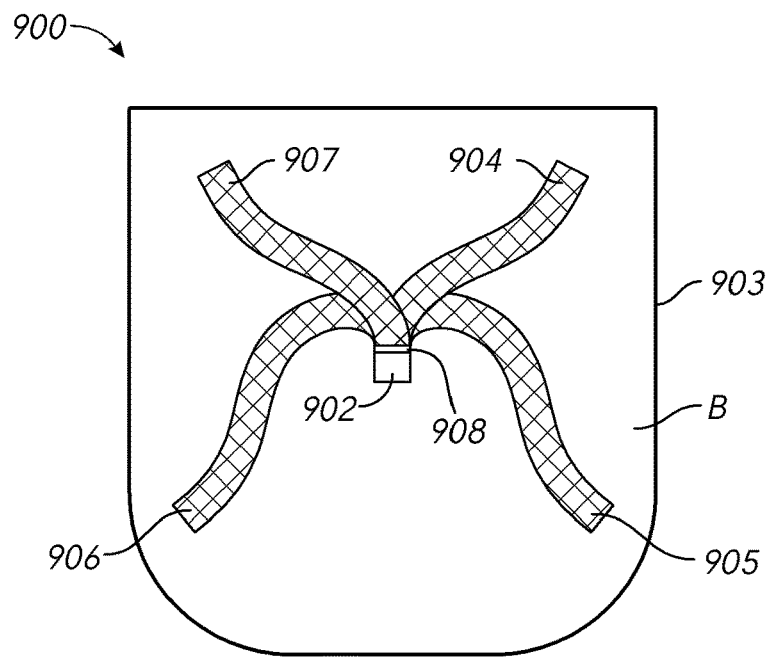
FIG. 9 is a top view of another embodiment of a seat climate control system according to the present disclosure.

FIG. 9 is a top view of another embodiment of the system 900 in which a single thermoelectric device 908 is coupled to more than one conductive member (e.g., four in the illustrated arrangement as illustrated by reference numbers 904, 905, 906, and 907). Similar to the embodiment shown in FIG. 4, a heat exchanger 902 may be coupled to the waste side of the thermoelectric device 908 and can be positioned within a channel formed in the support member or cushion 903. In some embodiments, the length of each conductive member may be between about 200-250 mm. In other embodiments, the length of each conductive member may be at least about 50 mm, at least about 75 mm, at least about 100 mm, at least about 125 mm, at least about 150 mm, at least about 200 mm, or at least about 225 mm. In other embodiments, the length of each conductive member may be between about 100-300 mm, between about 125-275 mm, or between about 150-250 mm. As described above, in certain arrangements, the conductive members and subsurface B of the cushion can be covered with a trim or top layer (e.g., a seat covering material such as upholstery, leather, cloth) and/or an intermediate layer (e.g., a spacer fabric, a comfort layer and/or an additional cushioning layer, etc.) positioned between the top layer and a seat cushion. In certain arrangements, the conductive members or portions thereof can form part of the trim or top layer and/or be positioned above the intermediate layer (if provided).

Figure 10:
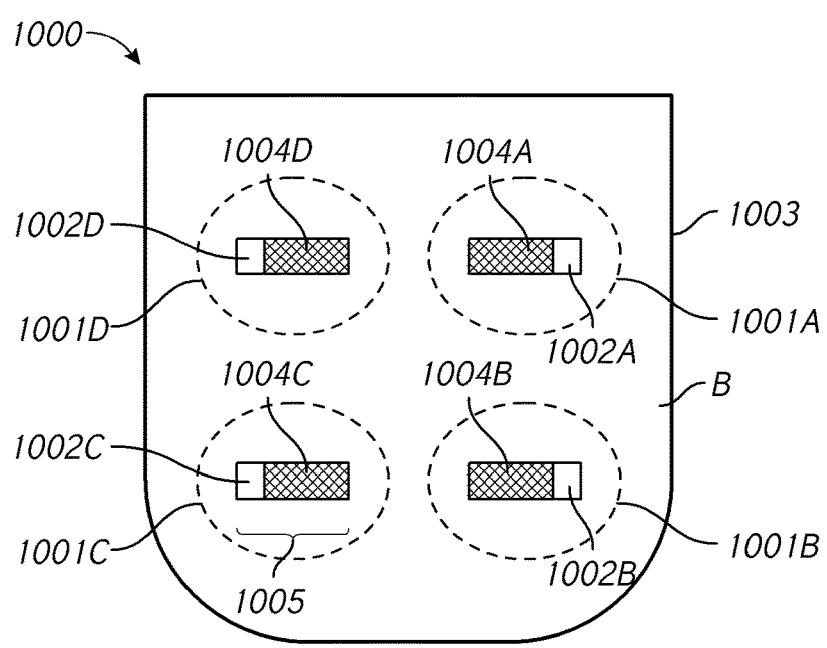
FIG. 10 is a top view of another embodiment of a seat climate control system according to the present disclosure.

FIG. 10 illustrates an embodiment in which the system 1000 can include more than one channel (e.g., four in the illustrated arrangement) formed in the support member or cushion 1003. Each channel defines a thermally-conditioned "zone" 1001A, 1001B, 1001C, and 1001D. Each channel or zone can include a one thermoelectric device and/or waste side heat exchanger, such as thermoelectric devices 1002A, 1002B, 1002C, and 1002D. One or more conductive members (e.g., conductive flexible braids) can be coupled to each of the thermoelectric devices, as illustrated by conductive members 1004A, 1004B, 1004C, and 1004D. In some embodiments, the length of each conductive member (one illustrative length 1005 is illustrated) may be between about 50-100 mm. In other embodiments, the length of each conductive member may be at least 25 mm, at least 40 mm, at least 50 mm, at least 65 mm, or at least 75 mm. In other embodiments, the length of each conductive member may be between 25 and 125 mm, between 35 and 100 mm, or between 50 and 75 mm. As described above, in certain arrangements, the conductive members 1004A-D and subsurface B of the cushion can be covered with a trim or top layer (e.g., a seat covering material such as upholstery, leather, cloth) and/or an intermediate layer (e.g., a spacer fabric, a comfort layer and/or an additional cushioning layer, etc.) positioned between the top layer and a seat cushion. In certain arrangements, the conductive members or portions thereof can form part of the trim or top layer and/or be positioned above the intermediate layer (if provided).

Figure 11:
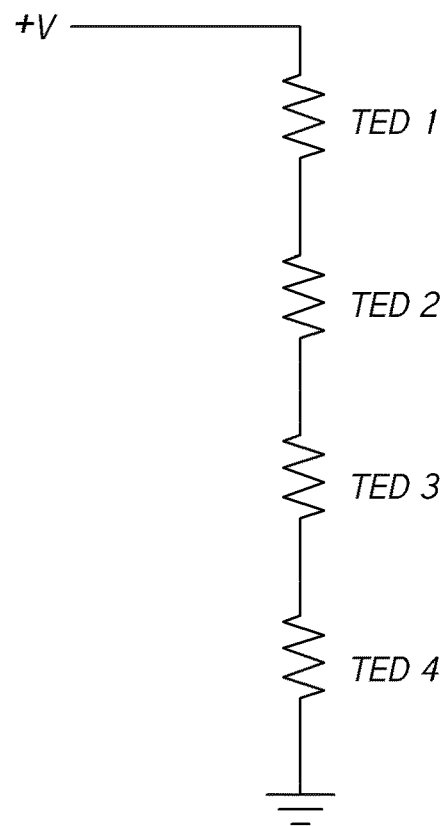
FIG. 11 illustrates a set of thermoelectric devices (TEDs) arranged in series according to the present disclosure.
Figure 12:
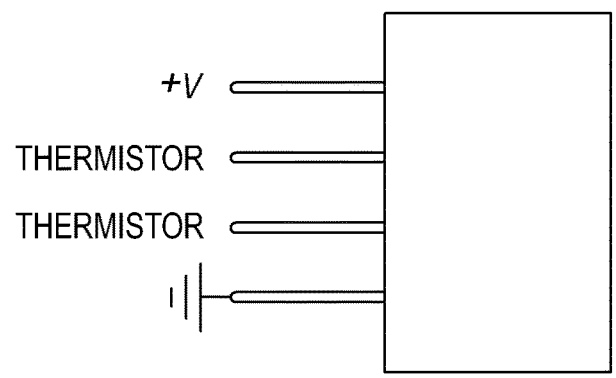
FIG. 12 illustrates an on-board thermistor for measuring temperature according to the present disclosure.

FIG. 10 illustrates one conductive element associated with each channel. Although not illustrated in FIG. 10, each channel can be associated with a blower and/or a manifold system could be provided beneath and/or within so as to withdraw air from each of the channels with a single blower (or combination of blowers). In embodiments that include multiple thermoelectric devices, the thermoelectric devices can be arranged in series as shown in FIG. 11 or in parallel. When the thermoelectric devices are arranged in series, as shown in FIG. 11, less wiring may be needed. When the thermoelectric devices are arranged in parallel, a failure of one thermoelectric device will not affect the remaining thermoelectric devices and the remaining devices will continue to operate. As shown in FIG. 12, the system can include at least one on-board thermistor for measuring the temperature of the thermoelectric device. The temperature information can be used as part of a control and/or safety system.

Figure 13:
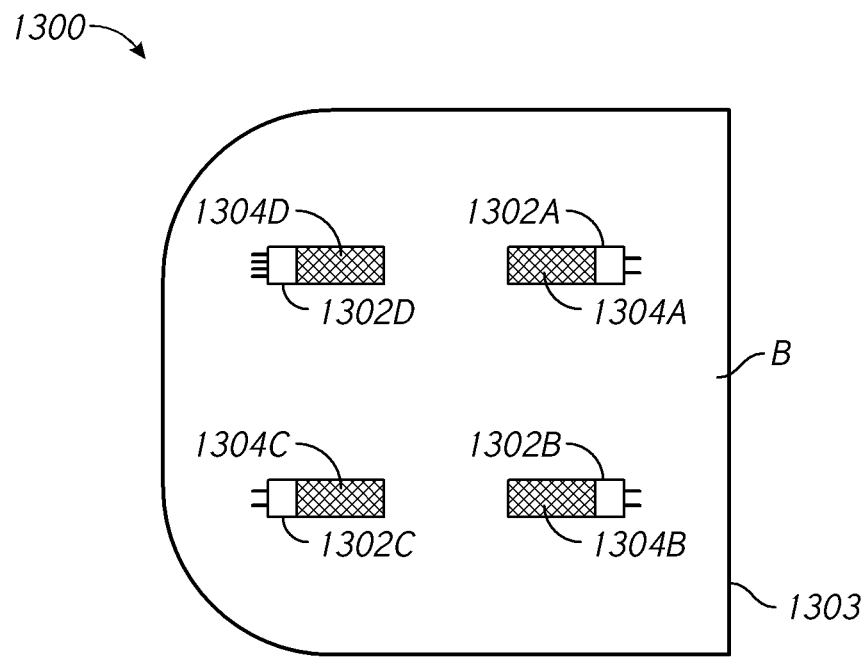
FIG. 13 is a top view of another embodiment of a seat climate control system according to the present disclosure.

FIG. 13 illustrates an embodiment of the system 1300 in which multiple thermoelectric devices are used but only one of the thermoelectric devices includes a thermistor. As shown in FIG. 13, the seat 1303 can have multiple channels formed in the support member or cushion 1303 with each channel containing a thermoelectric device connected to one or more conductive members (e.g., conductive flexible braids). Each of the conductive members 1304A, 1304B, 1304C, and 1304D is connected to a thermoelectric device 1302A, 1302B, 1302C, 1302D. As illustrated, each of the thermoelectric devices 1302A, 1302B, and 1302C are two-wire thermoelectric devices while the thermoelectric device 1302D is a four-wire thermoelectric device equipped with a thermistor to measure the temperature of the thermoelectric device. In other embodiments, one or more of the thermoelectric devices 1302A, 1302B, 1302C, 1302D may include thermistors for measuring the temperature(s) of the thermoelectric device(s). Desirably, to minimize conduction losses throughout the conductive member, the thermoelectric device should be located as close to the top or "A" surface of the seat as possible. As described above, in certain arrangements, the conductive members 1304A-D and subsurface B of the cushion 1303 can be covered with a trim or top layer (e.g., a seat covering material such as upholstery, leather, cloth) and/or an intermediate layer (e.g., a spacer fabric, a comfort layer and/or an additional cushioning layer, etc.) positioned between the top layer and a seat cushion. In certain arrangements, the conductive members or portions thereof can form part of the trim or top layer and/or be positioned above the intermediate layer (if provided).

Figure 14:
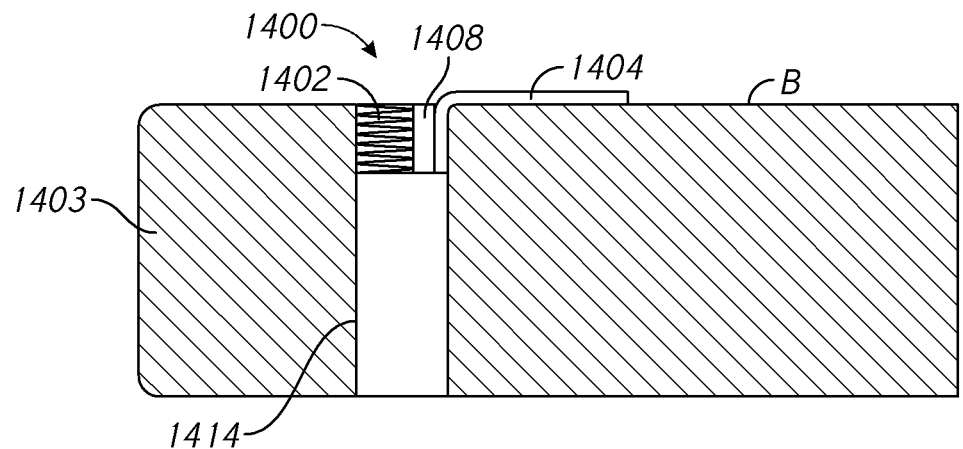
FIG. 14 is a cross-sectional side view of another embodiment of a seat climate control system according to the present disclosure.
Figure 15:
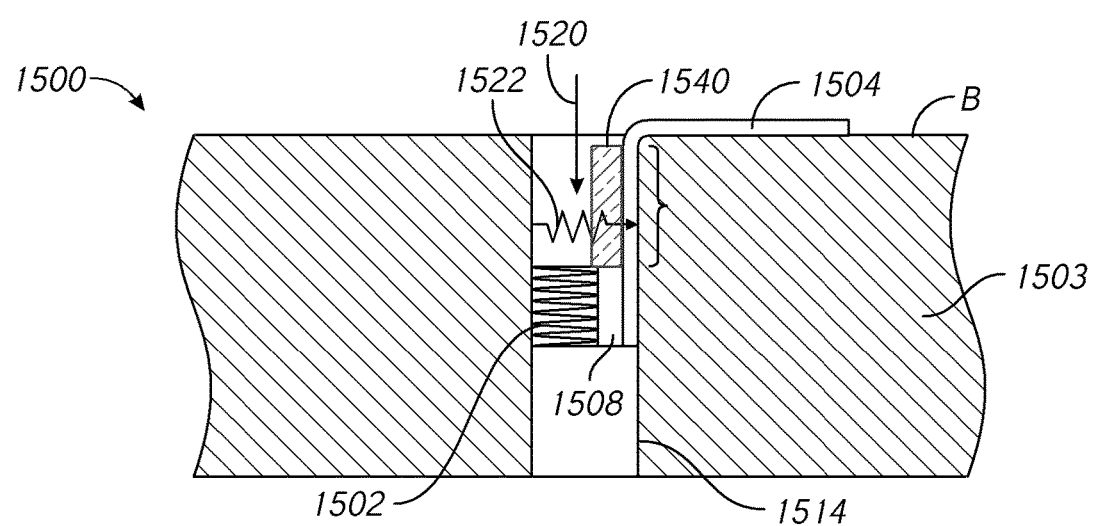
FIG. 15 is a cross-sectional side view of another embodiment of a seat climate control system according to the present disclosure.

As described above, in one embodiment, the thermoelectric device and the waste side heat exchanger are positioned beneath the top surface of the cushion and generally within a channel that extends through the seat. FIGS. 14 and 15 illustrate two locations for a thermoelectric assembly within a seat 1403. As shown in FIG. 14, the thermoelectric assembly 1400 can be positioned near or adjacent the top surface of the seat 1403. As with the thermoelectric assembly 302 discussed above with respect to FIG. 4, conductive cooling can be provided by a thermoelectric device 1408 having a flexible conductive member 1404 (e.g., a braid made of conductive material) extending along the subsurface B. The flexible conductive member 1404 is in the illustrated embodiment is positioned beneath the conditioned surface (e.g., by placing the flexible conductive element 1404 beneath the trim and/or covering of the seat). In some embodiments, fins 1402 may be placed on the waste or hot side of the thermoelectric device 1408. A channel 1414 may be provided such that air may be pulled through the cushion 1403 and through a heat exchanger 1402 as discussed above with respect to FIGS. 3 and 4.

In other embodiments, the thermoelectric assembly can be positioned deeper within the seat 1503, as illustrated by assembly 1500 shown in FIG. 15. The flexible conductive member 1504 is in the illustrated embodiment is positioned beneath the conditioned surface (e.g., by placing the flexible conductive element 1504 beneath the trim and/or covering of the seat). In some embodiments, fins 1502 may be placed on the waste or hot side of the thermoelectric device 1508. As shown in FIG. 15, one disadvantage of positioning the thermoelectric device 1508 and/or heat exchanger (e.g., fins 1502) deeper within the channel 1514 of the seat 1503 is that the ambient air 1520, which is typically at a higher temperature than the conductive member 1504, may heat the relatively cooler flexible conductive member 1504 as the air passes through the channel 1514, as illustrated by arrow 1522. This heat transfer by the ambient air to the member 1504 increases thermal losses. To mitigate this thermal loss, a thermally insulating material 1540 can be applied to the exposed surface of the conductive member. The thermally insulating material 1540 may be an insulated sheath wrapping around the conductive member 1504 or may be a coating on the side of the member 1504 facing the airflow.

Figure 16A:
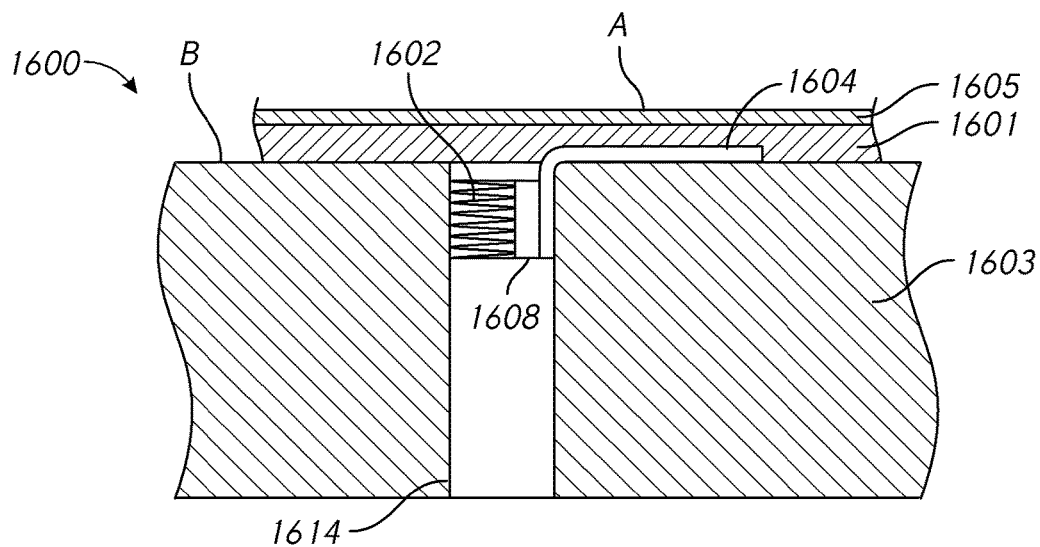
FIG. 16A is a cross-sectional side view of another embodiment of a seat climate control system according to the present disclosure.

FIG. 16A illustrates an arrangement of an assembly 1600 in which porous spacer material 1601 (e.g., a "comfort layer") is positioned between the top layer 1605 (e.g., leather or fabric) and the subsurface B of the seat 1603. In this arrangement, the flexible thermally conductive member 1604 can extend through an opening or gap in the spacer material 1601. The porous spacer material 1601 desirably facilitates the ventilation function of the seat, that is, allows air to be pulled through the top surface into the channels within the seat. The flexible conductive member 1604 is in the illustrated embodiment is positioned beneath the conditioned surface (e.g., by placing the flexible conductive element 1604 beneath the trim 1605 and/or covering of the seat). In some embodiments, fins or heat exchangers 1602 may be placed on the waste or hot side of the thermoelectric device 1608 and as shown the thermoelectric device can be positioned within a channel 1614 extending through the seat. In a modified arrangement, a groove or channel can be formed in the seat 1603 to accommodate the conductive member 1604 or a portion thereof and/or a groove or channel in the seat can be used in combination with an opening or gap in the spacer material 1601 to accommodate the conductive member 1604 or a portion thereof.

Figure 16B:
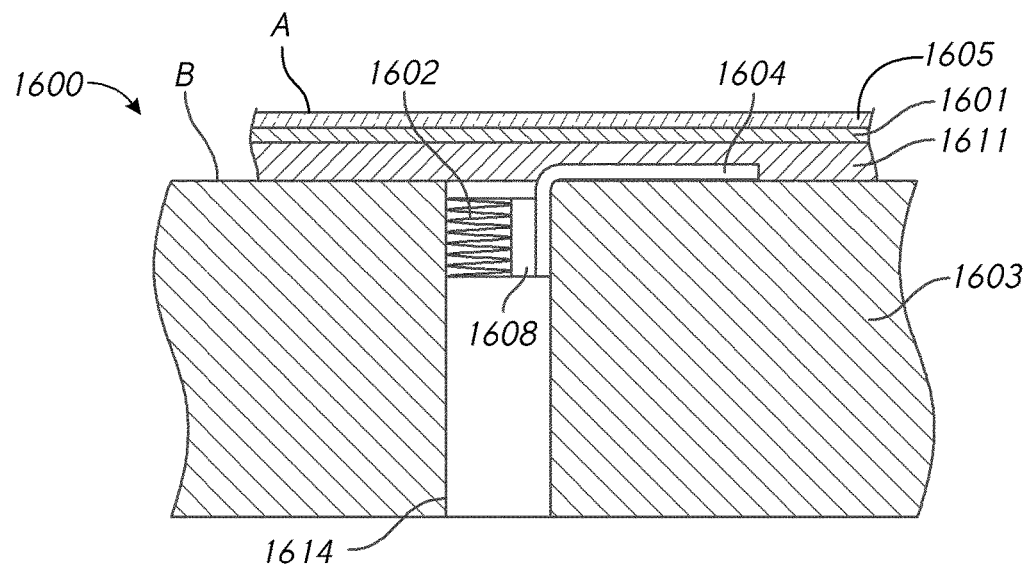
FIG. 16B is a cross-sectional side view of another embodiment hybrid seat climate control system according to the present disclosure.

FIG. 16B illustrates an embodiment of a thermoelectric assembly 1600 similar to the assembly shown in FIG. 16A; however, the assembly 1600 shown in FIG. 16B includes a supplemental heating layer 1611. This supplemental heating layer 1611 may be provided between a trim or top layer 1605 and the support surface B such that the supplemental heating layer 1611 extends along the surface B. In some embodiments, the supplemental heating layer 1611 may be adjacent to, above, or below the flexible member 1604. In some embodiments, the supplemental heating layer 1611 may be a resistive heater.

Figures 17A, 17B:
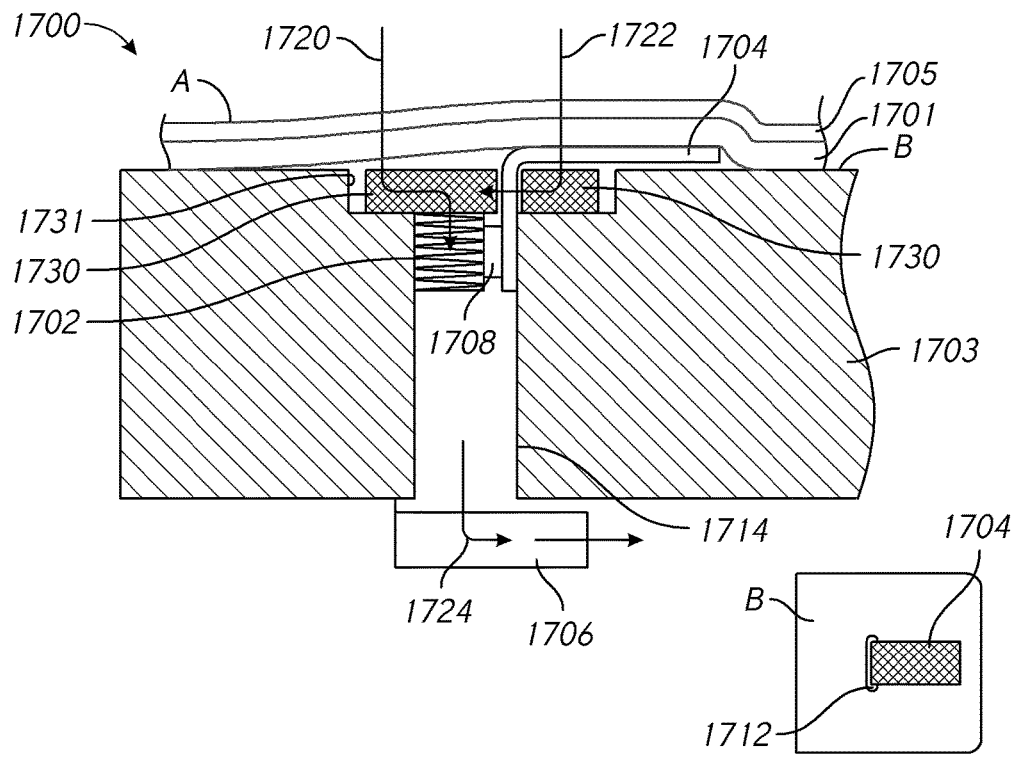
FIG. 17A is a cross-sectional side view of another embodiment of a seat climate control system according to the present disclosure.
FIG. 17B is a top view of the embodiment illustrated in FIG. 17A.

In other arrangements, the seat can include a recess or gap which can include spacer (air permeable) material. As shown in FIG. 17A and similar to the embodiments discussed above, conductive cooling can be provided by a thermoelectric device 1708 disposed in a channel 1714 and having a flexible conductive member 1704 extending along the subsurface B below a comfort layer 1701 and a trim layer 1705. The comfort or smoothing layer 1701 may be attached to the trim layer 1705, for example by adhesive and/or sewing. The comfort or smoothing layer 1701 can be configured to prevent or reduce any "read through" or transfer of heat/cooling from the conductive members that may cause user discomfort. In some embodiments, fins 1702 may be placed on the waste or hot side of the thermoelectric device 1708. The seat 1703 includes a recess or gap 1731 into which an air permeable material 1730 may be placed to allow lateral air movement. The recess 1731 may be located toward to the top surface A of the seat (that is, above the channel 1714) but below a trim layer 1705 and a comfort layer 1701. The air permeable material 1730 allows lateral air movement from the thermoelectric device 1708 and flexible conductive member 1704 to better distribute cool, ventilated air to the conditioned surface of the seat. A blower 1706 may pull air from the top surface A, through the trim layer 1705, the comfort layer 1701, the lateral air permeable material 1730, and through the channel 1714, as indicated by arrows 120, 1722, and 1724. In some embodiments, a notch or slit may be provided in the subsurface B to allow the flexible conductive material to pass through. As illustrated in FIG. 17B, the subsurface B may include a slot 1712 through which the flexible conductive member 1704 is passed.

Figure 18:
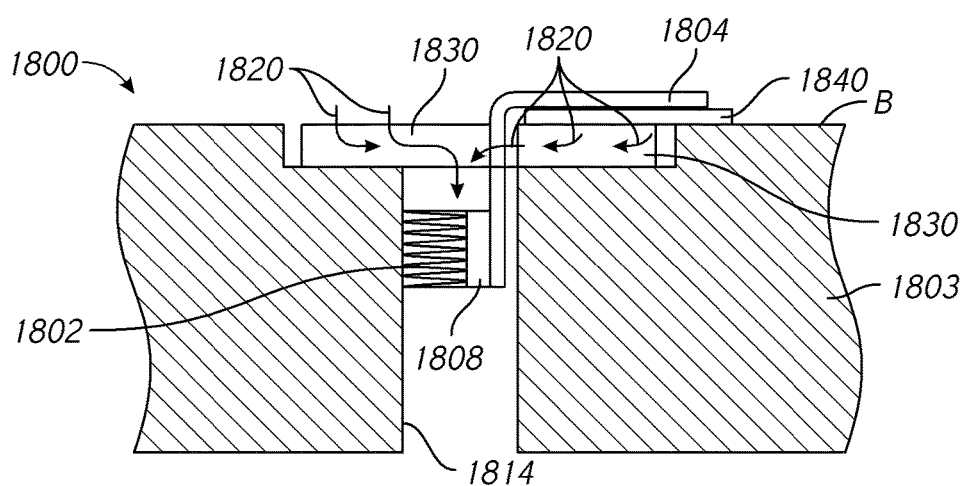
FIG. 18 is a cross-sectional side view of another embodiment of a seat climate control system according to the present disclosure.

FIG. 18 illustrates an embodiment in which thermally insulating material 1840 is provided on a side of the flexible conductive member 1804 to prevent, for example, cold air from being drawn into the seat 1803 away from the occupant. As shown in FIG. 18 and similar to the embodiments discussed above, conductive cooling can be provided by a thermoelectric device 1808 disposed in a channel 1814 and having a flexible conductive member 1804 extending along the subsurface B. In some embodiments, fins 1802 may be placed on the waste or hot side of the thermoelectric device 1808. The thermally insulating material 1840 may be provided on a side of the flexible conductive member 1804 between the flexible conductive member 1804 and the subsurface B. The thermally insulating material 1840 can prevent cold air from being drawn into the seat 1803 away from the occupant but allows air to flow from the top surface of the seat 1803 and through the channel 1814. In one embodiment, the insulating material can comprise a foam such as a cross-linked foam such as Volara®. Similar to FIG. 17A, discussed above, the embodiment illustrated in FIG. 18 may include an air permeable material 1830 positioned in a recess of the seat 1803 to allow lateral air movement from the thermoelectric device 1808 and flexible conductive member 1804 to better distribute cool, ventilated air to the conditioned surface of the seat. The air permeable material 1830 can be configure to generally allow air flow through the permeable material 1830 while providing structural support similar to the surrounding seat 1803 material.

FIGS. 19-35 provide additional disclosure and embodiments of a seat system employing a combination of convective and conductive thermal conditioning. For example, FIGS. 19-35 illustrate various embodiments and methods for coupling the flexible thermally conductive member to the thermoelectric device.

Figure 19A:
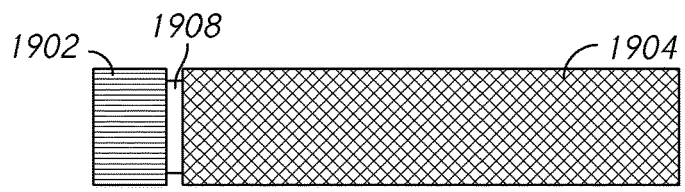
FIG. 19A illustrates a top view of an embodiment of coupling a thermally conductive element to a thermoelectric device according to the present disclosure.
Figure 19B:
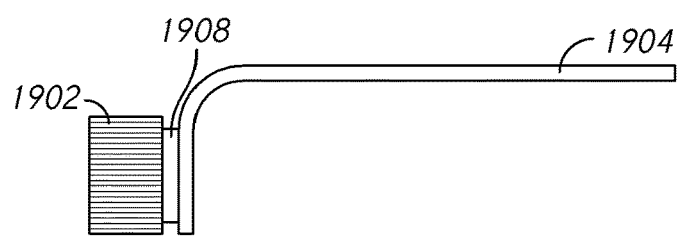
FIG. 19B illustrates a side view of the embodiment illustrated in FIG. 19A.

FIGS. 19A and B illustrate two views of one embodiment of a configuration for a flexible conductive member. In this embodiment, a single flexible conductive member 1904 is connected to the thermoelectric device 1908. As illustrated, in some embodiments, one or more heat transfer devices, such as fins 1902, may be placed on the waste or hot side of the thermoelectric device 1908.

Figure 20A:
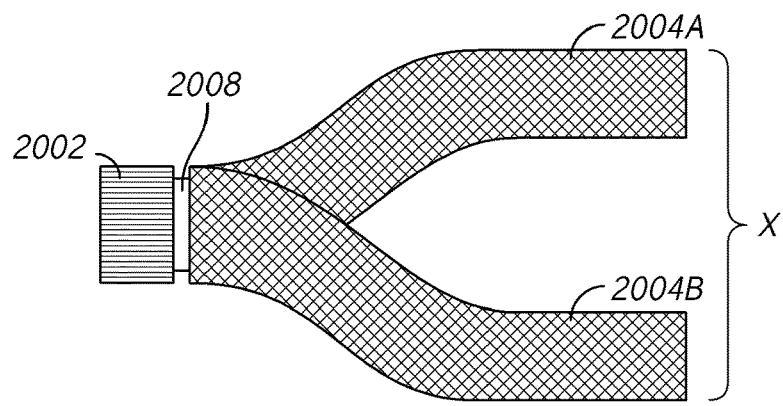
FIG. 20A illustrates a top view of another embodiment of coupling a thermally conductive member to a thermoelectric device according to the present disclosure.
Figure 20B:
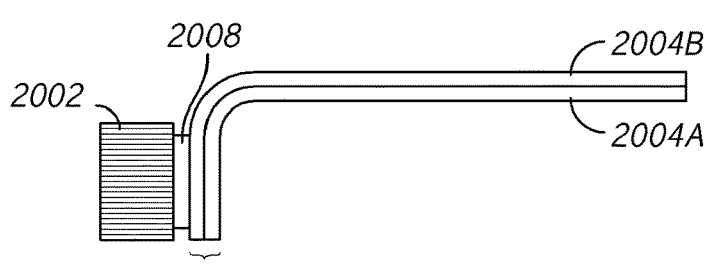
FIG. 20B illustrates a side view of the embodiment illustrated in FIG. 20A.
Figure 21A:
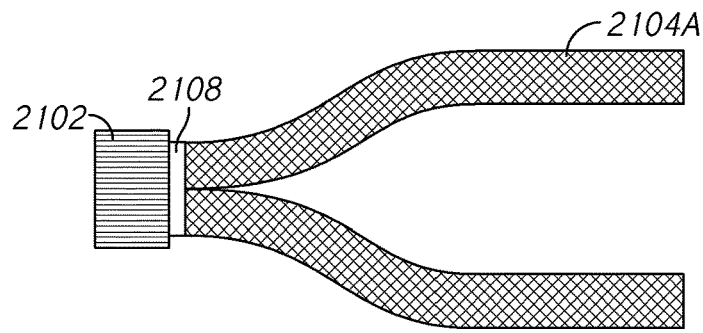
FIG. 21A illustrates a top view of another embodiment of coupling a thermally conductive member to a thermoelectric device according to the present disclosure.
Figure 21B:
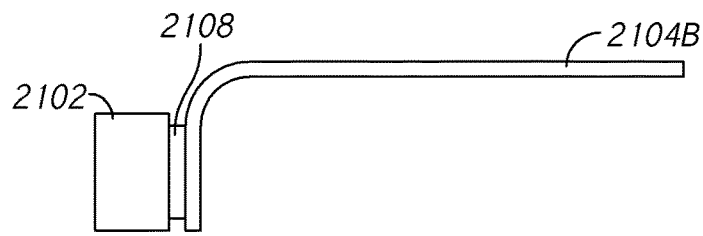
FIG. 21B illustrates a side view of the embodiment illustrated in FIG. 21A.
Figure 21C:
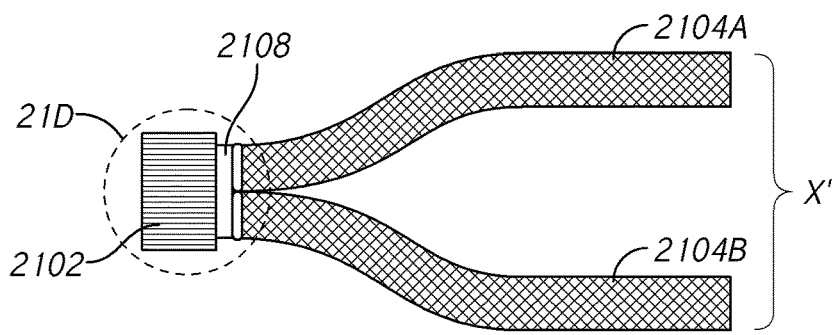
FIG. 21C illustrates another top view of the embodiment illustrated in FIG. 21A.
Figure 21D:
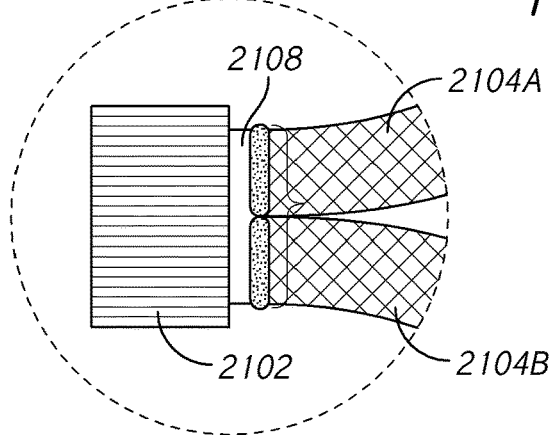
FIG. 21D illustrates an enlarged view of the connection between the flexible conductive members and the thermoelectric device of the embodiment illustrated in FIG. 21C.

Another embodiment of a configuration for a flexible conductive member is shown in FIGS. 20A and B. In this embodiment, two flexible conductive members 2004A and 2004B are connected to the thermoelectric device 2008. Upon placement in the seat, the two flexible conductive members 2004A and 2004B can be spread apart a distance X to provide additional coverage area. As illustrated in the side or profile view of FIG. 20B, the two flexible members 2004A, 2004B may be stacked one on top of the other when connected to the thermoelectric device 2008. While two flexible conductive members are illustrated in FIGS. 20A and B, other configurations may include 3, 4, 5, or 6 flexible conductive members connected to the thermoelectric device in a stacked or parallel configuration. As illustrated, in some embodiments, one or more heat transfer devices, such as fins 2002, may be placed on the waste or hot side of the thermoelectric device 2008.

Instead of a stacked configuration such as that shown in FIGS. 20A and B, one or more flexible conductive members may be connected in series or laterally to the thermoelectric device, as illustrated in FIGS. 21A-D. As illustrated, flexible conductive members 2104A and 2104B are connected side by side or laterally to the thermoelectric device 2108. As with the configuration discussed above with respect to FIGS. 20A and B, the flexible conductive members 2104A and 2104B may be spread apart a distance X' to provide additional and more uniform coverage. As illustrated, in some embodiments, one or more heat transfer devices, such as fins 2102, may be placed on the waste or hot side of the thermoelectric device 2108.

While the embodiments discussed above have been discussed with regard to providing a cooling function, these embodiments may also be used with or without a blower to operate in a heating mode to provide heated air to a conditioned surface of a seat.

Figure 22A:
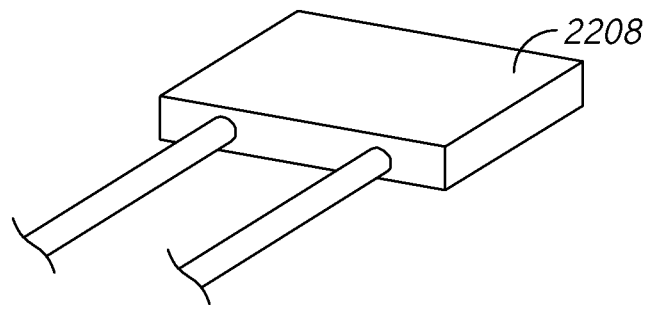
FIG. 22A illustrates one embodiment of a thermoelectric device according to the present disclosure.
Figure 22B:
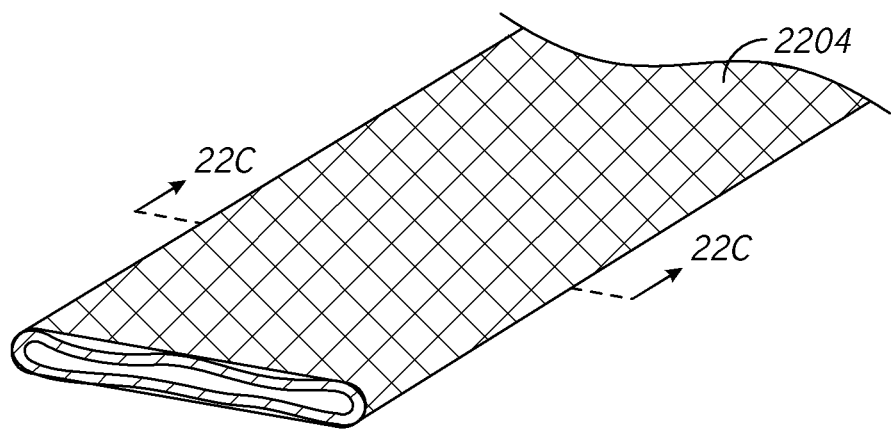
FIG. 22B illustrates one embodiment of a flexible conductive member according to the present disclosure.
Figure 22C:
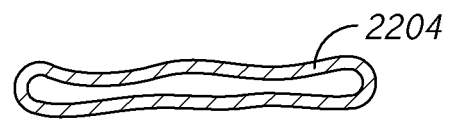
FIG. 22C illustrates a cross-section of the flexible conductive member illustrated in FIG. 22B.
Figure 23:
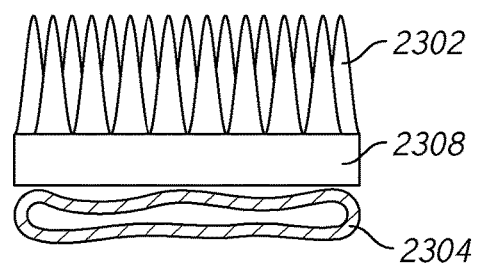
FIG. 23 illustrates a coupling between a flexible conductive member and a thermoelectric device.

FIGS. 22A-C illustrate one issue related to the assembly process of attaching the flexible conductive member to the thermoelectric device. A configuration of a thermoelectric device can include a conductive layer such as for example an outer copper layer. As shown, this outer copper layer of the thermoelectric device 2208 is very flat; however, the mesh of the flexible conductive member 2204 is not flat, that is, it has a rough surface due to its construction from overlapping or braided wires. The weaving or braiding of the wires creates an uneven surface having voids such that the flexible conductive member 2204 may be difficult to solder or attach to the flat surface of the thermoelectric device 2208. This difficulty is illustrated in FIG. 23. Directly soldering or otherwise attaching the flexible conductive member 2304 to the thermoelectric device 2308 may result in an unsatisfactory connection between the thermoelectric device and the flexible conductive member. This unsatisfactory connection may result in reduced performance. Furthermore, voids in the soldered connection between the thermoelectric device and the flexible conductive member may create hot spots in the thermoelectric device and may be potential points of mechanical or thermal fatigue during use. As illustrated, in some embodiments, one or more heat transfer devices, such as fins 2302, may be placed on the waste or hot side of the thermoelectric device 2308.

Figure 24:
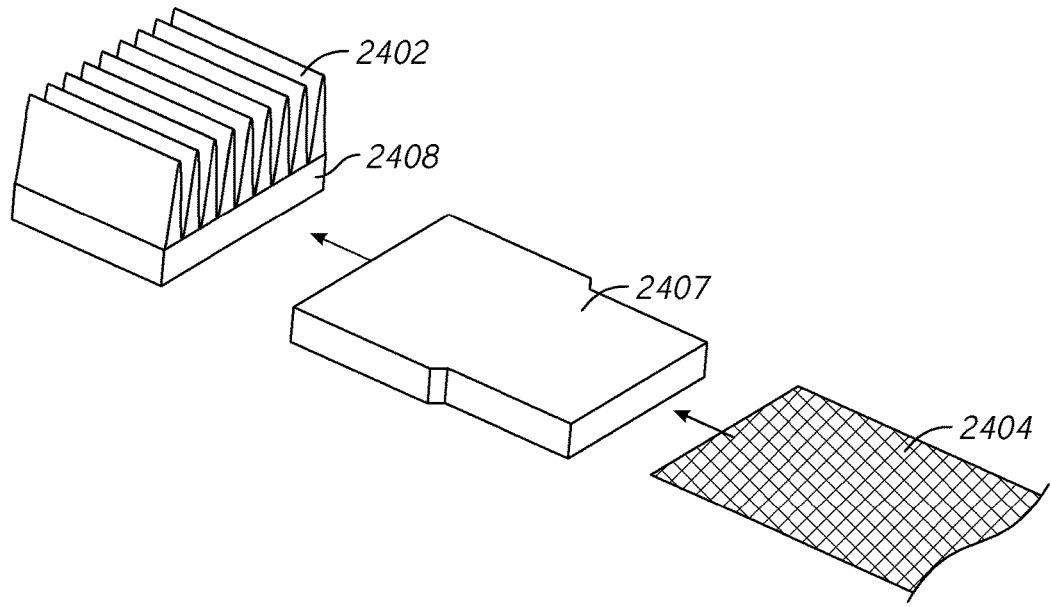
FIG. 24 illustrates a coupling between a flexible conductive member and a thermoelectric device according to the present disclosure.
Figure 25:
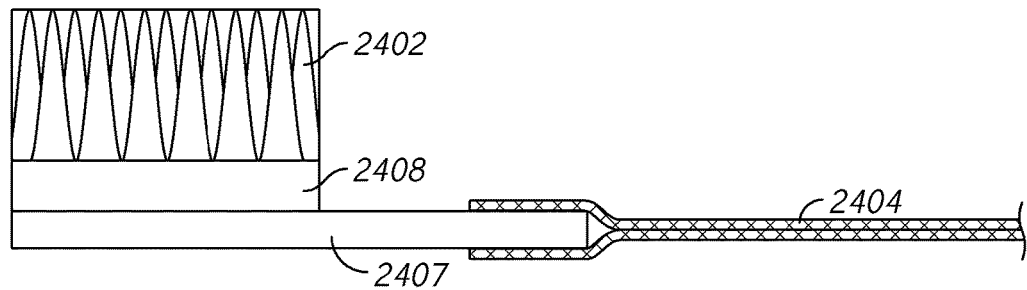
FIG. 25 illustrates a side view of another embodiment of coupling a thermally conductive member to a thermoelectric device according to the present disclosure.

In one embodiment, illustrated in FIGS. 24 and 25, a thermal intermediate flat copper plate 2407 could be positioned between the thermoelectric device 2408 and the flexible conductive member 2404 (e.g., copper braid). Such an arrangement may provide better soldering at the thermoelectric device 2408 (e.g. "flat-on-flat" copper plate of the thermoelectric device to intermediate copper plate, as opposed to the "flat-on-rough" of the thermoelectric device copper plate to the flexible conductive member) which may allow for a wider variety of configurations of the flexible conductive member (e.g. multiple "off-shoots" of the braid) and better coverage on the seat. FIG. 25 illustrates a side view of the assembly illustrated in FIG. 24. As shown, the flexible conductive member 2404 is connected to the intermediate flat copper plate 2407 which is then soldered or otherwise attached to the thermoelectric device 2408. This "flat-on-flat" connection improves the solder connection between the elements, providing durability and heat transfer benefits. As illustrated, in some embodiments, one or more heat transfer devices, such as fins 2402, may be placed on the waste or hot side of the thermoelectric device 2408.

Figure 26:
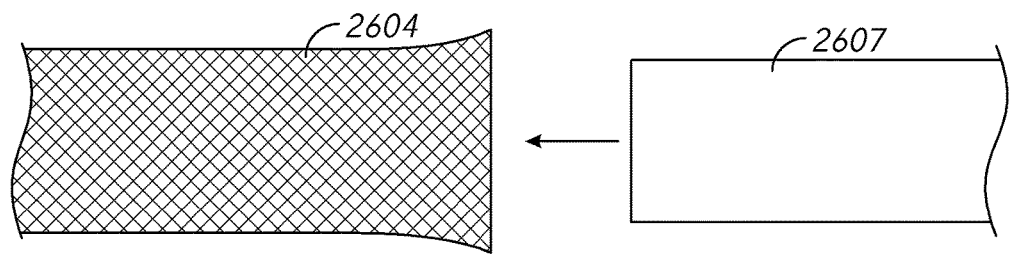
FIG. 26 illustrates a side view of another embodiment of coupling a thermally conductive member to a thermoelectric device according to the present disclosure.
Figure 26:
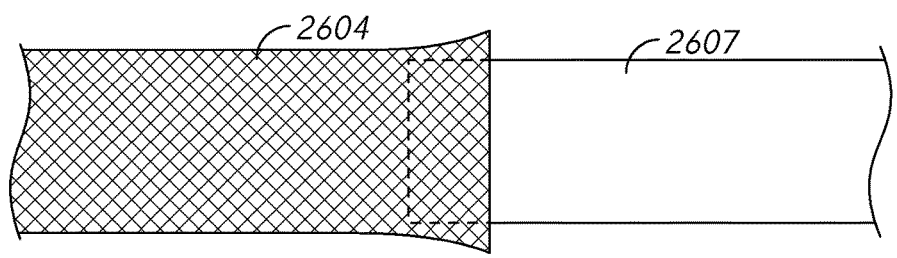
Figure 27A:
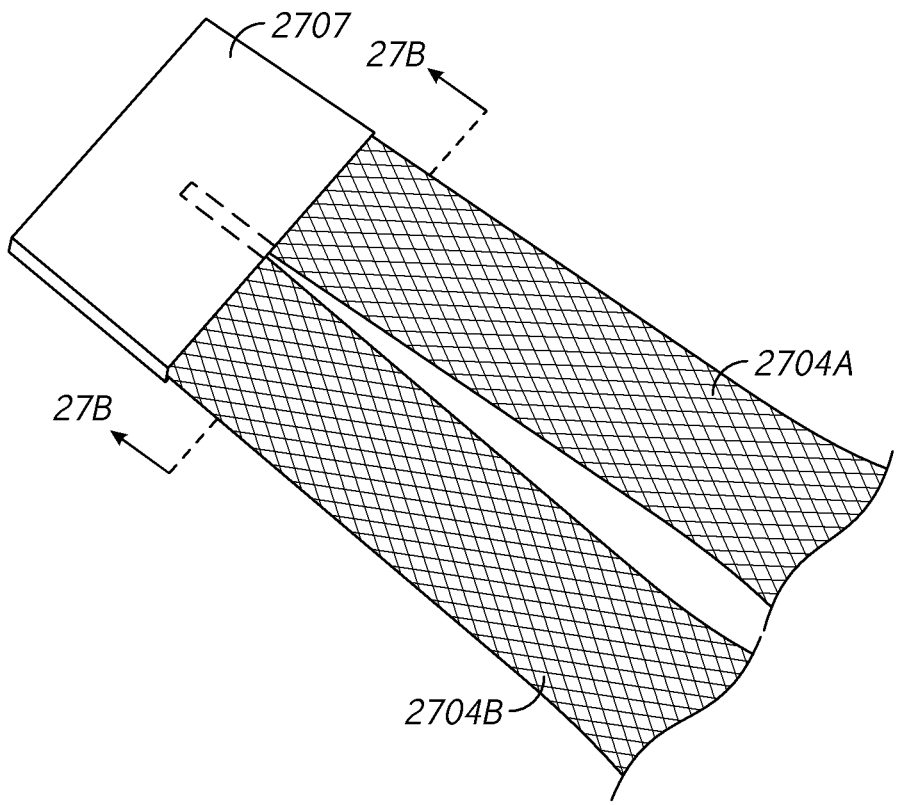
FIG. 27A illustrates a view of another embodiment of coupling a thermally conductive member to a thermoelectric device according to the present disclosure.
Figure 27B:
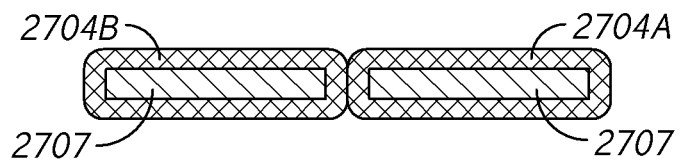
FIG. 27B illustrates a cross-section of the embodiment shown in FIG. 27A.

Various embodiments of intermediate plate and flexible member assemblies are shown in FIGS. 26-28. As shown in FIG. 26, the intermediate flat plate 2607 fits within the flattened "tube" of the flexible conductive member 2604. In some embodiments, the intermediate plate may be "pre-tinned" to improve the connection between the intermediate plate 2607 and the flexible conductive member 2604. An intermediate plate and flexible member assembly having multiple flexible conductive members is shown in FIG. 27. In this embodiment, the flexible conductive members 2704A and 2704B are connected in series to an intermediate flat plate 2707. As illustrated in FIG. 27B, the intermediate plate 2707 may have "prongs" such that each of the flexible members 2704A, 2704B can fit around one of the "prongs" to provide a secure connection between the flexible members and the intermediate plate.

Figure 28A:
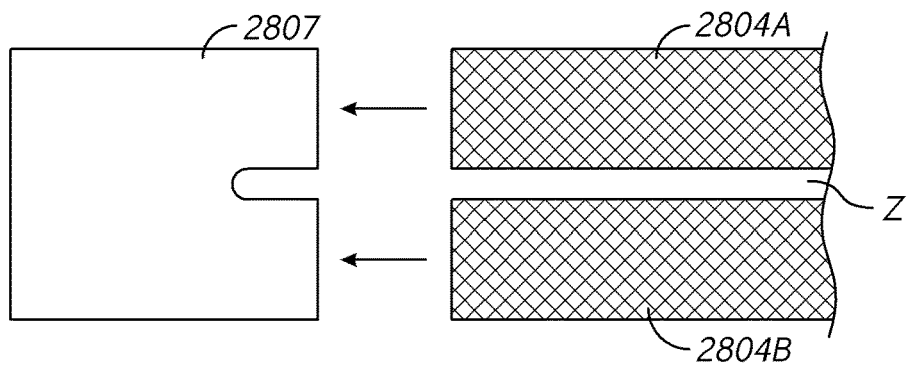
FIG. 28A illustrates another embodiment of coupling a thermally conductive member to a thermoelectric device according to the present disclosure.
Figure 28B:
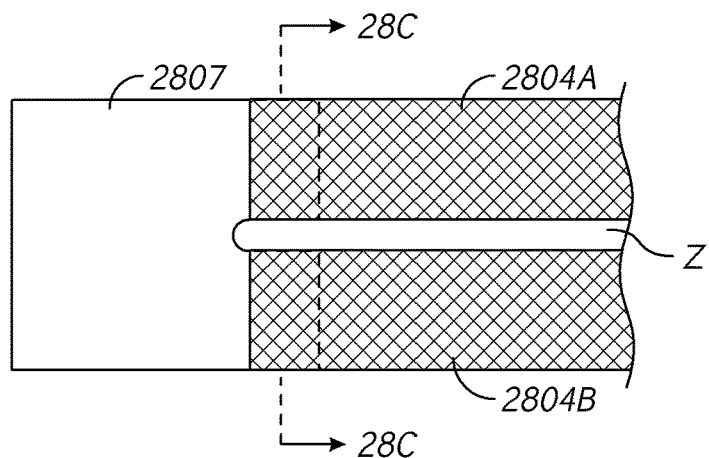
FIG. 28B illustrates another view of the embodiment illustrated in FIG. 28A.
Figure 28C:
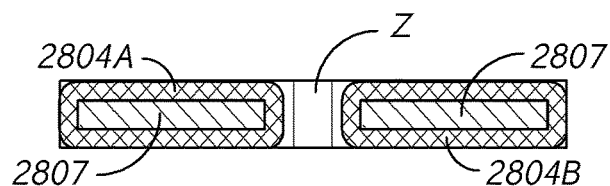
FIG. 28C illustrates a cross-section of the embodiment illustrated in FIG. 28B.

In some embodiments, the "prongs" extending from the intermediate plate may be separated such that the flexible conductive members do not touch or overlap when connected to the intermediate plate. As illustrated in FIGS. 28A-C, the intermediate plate 2807 is configured such that the flexible conductive members 2804A, 2804B are separated by a gap Z. The "prongs" of the intermediate plate 2807 fit within the flexible conductive members 2804A, 2804B to provide a secure connection between the flexible conductive members and the intermediate plate. The gap Z is configured to allow for clearance of the thickness of the flexible conductive members 2804A, 2804B around the prongs of the intermediate member 2807.

Figure 29:
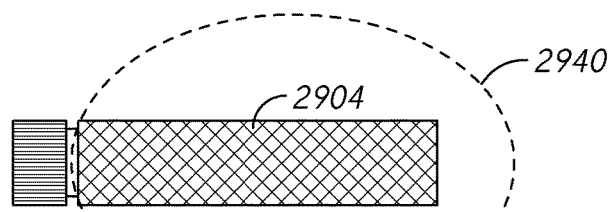
FIG. 29 illustrates one embodiment of a conditioning zone for one configuration of a thermally conductive member coupled to a thermoelectric device according to the present disclosure.
Figure 30:
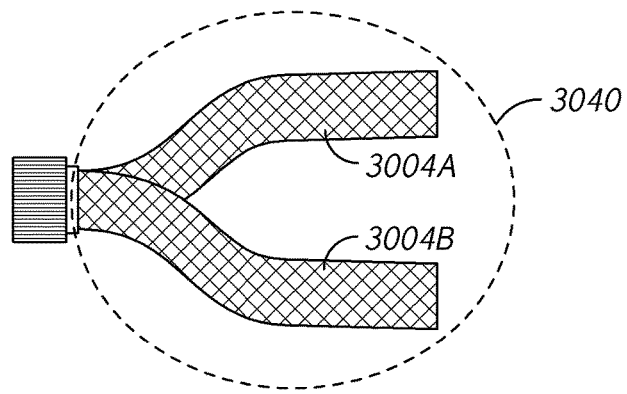
FIG. 30 illustrates another embodiment of a conditioning zone for one configuration of a thermally conductive member coupled to a thermoelectric device according to the present disclosure.

FIGS. 29-35 describe a flexible conductive element having modified shapes, sizes, and configurations. As discussed above, the use of multiple flexible conductive members connected to a thermoelectric device can provide better flexibility for coverage of the seat or conditioned surface in certain arrangements. FIGS. 29 and 30 illustrate the different cooling zone areas provided by two different flexible conductive member configurations. In FIG. 29, a single flexible conductive member 2904 provides a cooling zone area 2940. A larger cooling zone 3040 is illustrated in FIG. 30, as a result of two flexible conductive members 3004A, 3004B connected to the thermoelectric device.

Figure 31:
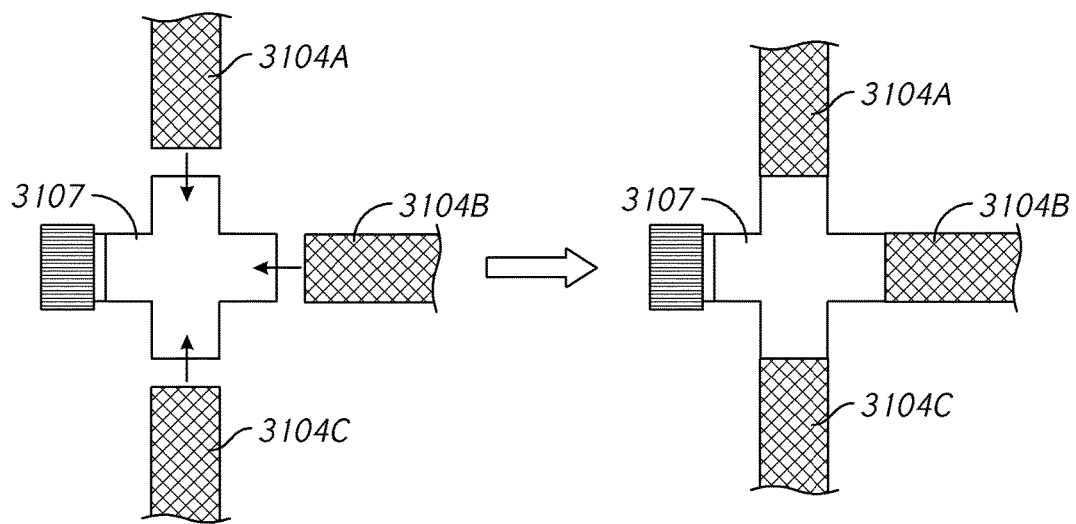
FIG. 31 illustrates another embodiment of coupling a plurality of thermally conductive members to a thermoelectric device according to the present disclosure.
Figure 32:
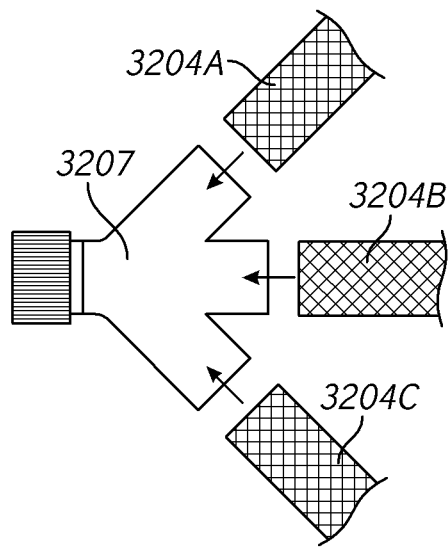
FIG. 32 illustrates another embodiment of coupling a plurality of thermally conductive members to a thermoelectric device according to the present disclosure.
Figure 33:
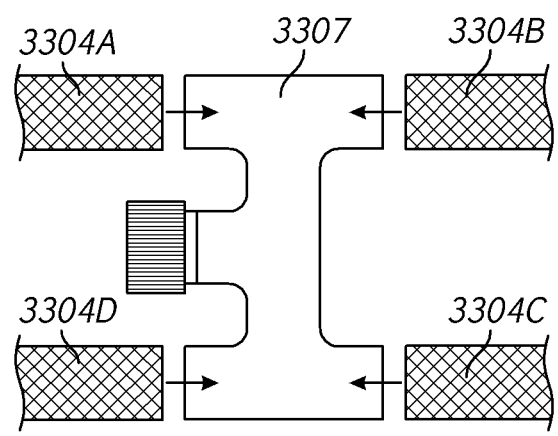
FIG. 33 illustrates another embodiment of coupling a plurality of thermally conductive members to a thermoelectric device according to the present disclosure.
Figure 34:
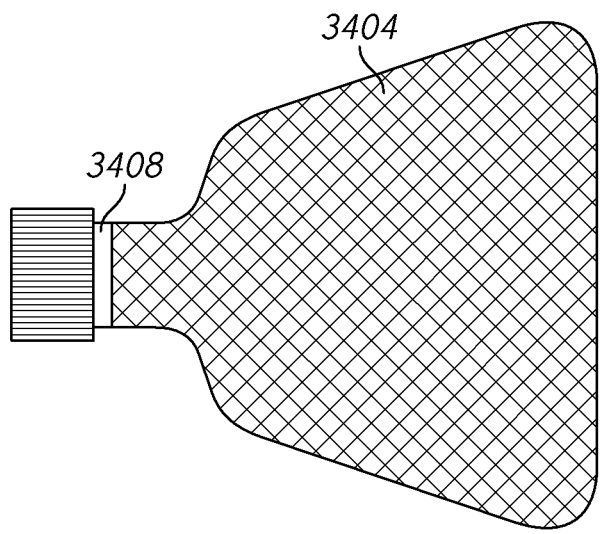
FIG. 34 illustrates another embodiment of coupling a thermally conductive member to a thermoelectric device according to the present disclosure.
Figure 35:
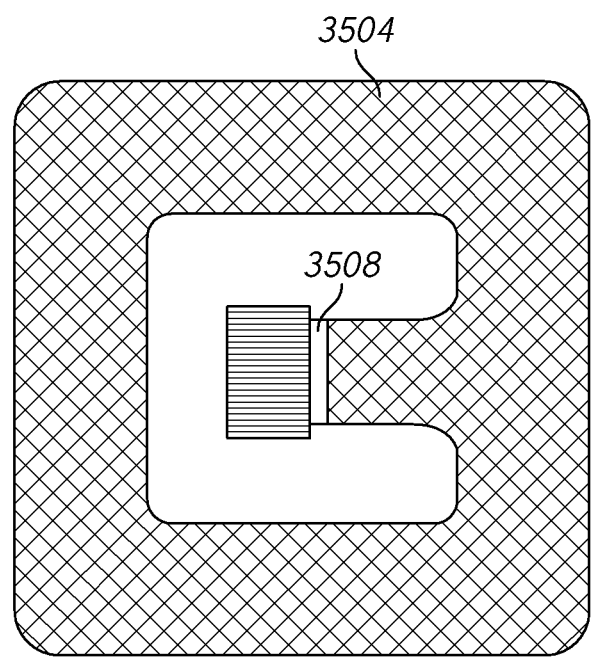
FIG. 35 illustrates another embodiment of coupling a thermally conductive member to a thermoelectric device according to the present disclosure.

FIGS. 31-35 illustrate various configurations of multiple flexible conductive members connected to a thermoelectric device. As illustrated in FIG. 31, multiple flexible conductive members 3104A-C are connected to the thermoelectric device via the intermediate plate 3107. Similarly, the intermediate plates 3207 and 3307 illustrated in FIGS. 32 and 33, respectively, illustrate another configuration for attachment of multiple flexible conductive members 3204A-C, and 3304A-D. These configurations provide an even large zone of conditioning due than the configurations shown in FIGS. 29 and 30. As illustrated in FIGS. 34 and 35, the flexible conductive member could also be in a flat, non-rectangular configuration, as illustrated by conductive members 3404 and 3504. The flexible conductive member may be cut to any shape, including non-rectangular shapes, depending on the size and configuration of the support member and surface to be conditioned. In these configurations, greater distribution of cold or heat is achieved.

Figure 36:
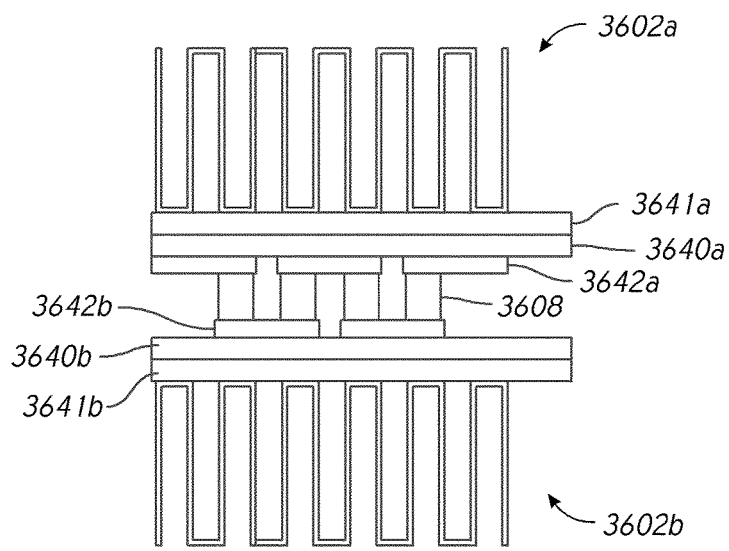
FIG. 36 illustrates another embodiment of coupling a thermally conductive member to a thermoelectric device according to the present disclosure.

FIG. 36 illustrates another configuration of a thermoelectric assembly that can be used in embodiments according to the present disclosure. This thermoelectric device can be used with any of the climate control assemblies discussed above. In the illustrated configuration, a thermoelectric device is comprised of a first copper plate 3641a, a first electrically insulating layer 3640a, a first interconnecting layer 3642a, thermoelectric pellets 3608, and a second interconnecting layer 3642b, a second electrically insulating layer 3640b, and a second copper plate 3641b. Fins 3602a and 3602b may be placed on the outside surfaces of the copper plates 3641a, 3641b to form a heat transfer device to conduct heat away from the thermoelectric device. In this embodiment, the thermoelectric device includes fins on both sides of the device. However, as described in the embodiments described above, the fins on one side of the device can be omitted and the copper plate can be coupled to a flexible conductive member. In some configurations, the insulating layers 3640a, 3640b may be formed of an epoxy or polyimide. Additional details of an exemplary thermoelectric device can be found in U.S. patent application Ser. No. 11/546,928 (Publication No. 2008/0087316) filed on Oct. 12, 2006, the entirety of which is hereby incorporated by reference herein.

Figure 37:
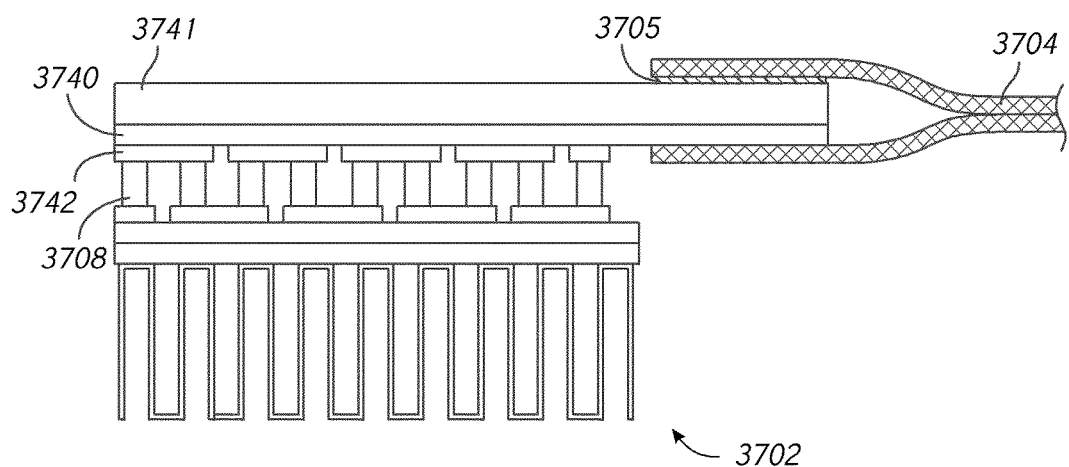
FIG. 37 illustrates another embodiment of coupling a thermally conductive member to a thermoelectric device according to the present disclosure.

FIG. 37 illustrates another configuration of a thermoelectric assembly similar to the embodiment described above with reference to FIG. 36 with similar numbers used to identify similar components. Instead of fins on onside of the device, the assembly can include a conductive plate—e.g., copper plate 3741 that extends beyond the additional layers comprising the thermoelectric device to provide a surface to solder 3705 or otherwise attach a flexible member 3604. As described above, other configurations can be provided for conductively coupling the flexible member 3604 to the thermoelectric assembly.

Figure 38A:
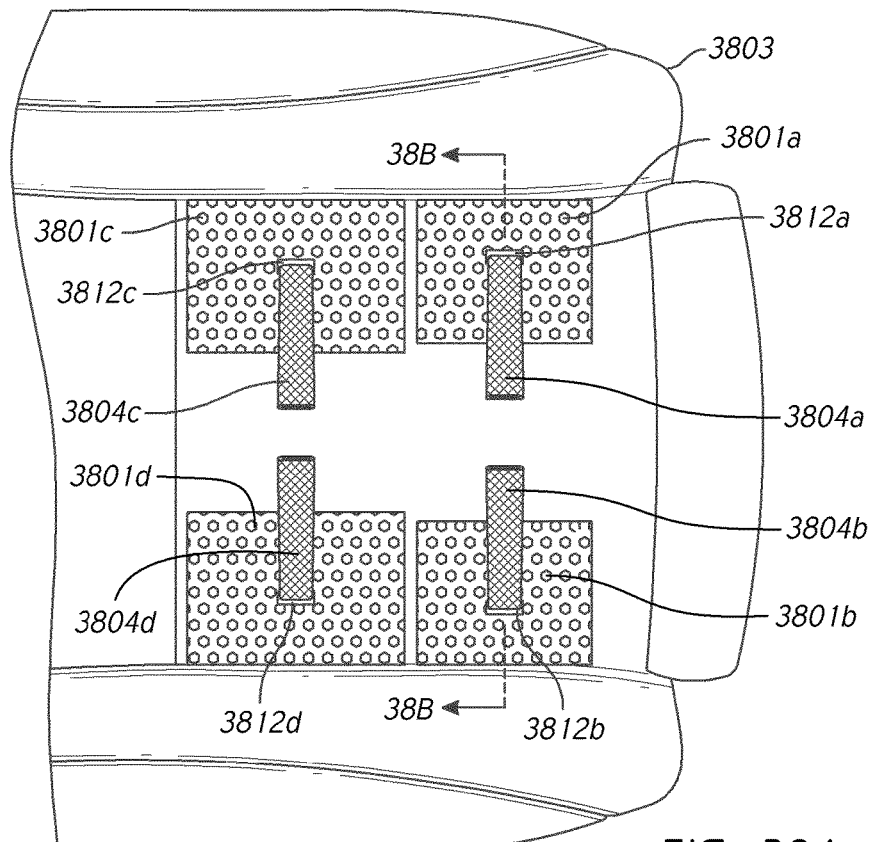
FIGS. 38A and 38B illustrate another embodiment of a seat climate control system according to the present disclosure with FIG. 38A being a top view of a seat control system and FIG. 38B being a cross-sectional view through FIG. 38A.
Figure 38B:
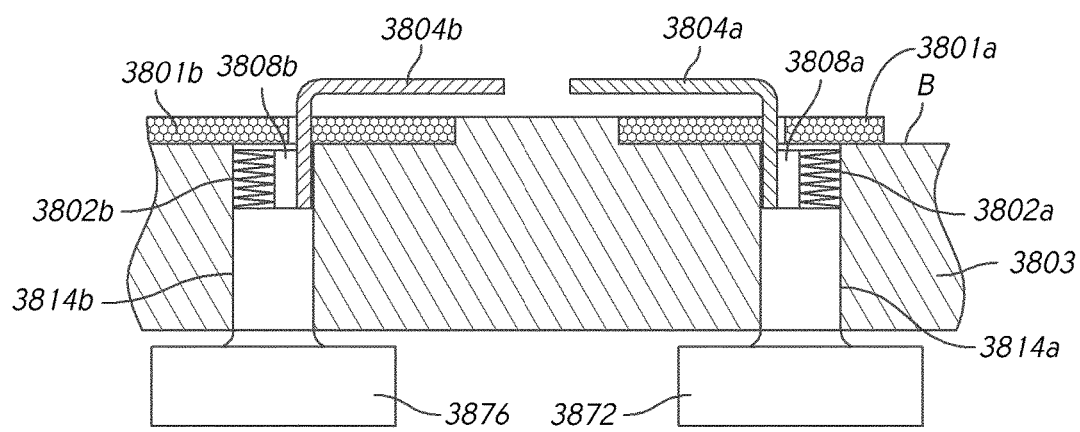

FIGS. 38A and B and 39A and B illustrate another climate control system for a seat according the present disclosure. As shown in FIGS. 38A (top view) and B (cross-sectional view), the flexible member 3804 may extend through an opening, channel or slot 3812 such that the flexible member 3804 extends along a surface below a comfort layer and a trim layer (both not shown), such as comfort layer 1701 and trim layer 1705 discussed above with respect to FIGS. 17A and 17B. In some configurations, the flexible members 3804a-d may be above (as shown) or below a spacer or distribution layer 3801a-d. The spacer layer 3801a-d as illustrated in FIGS. 38A and B can be between the flexible members 3804a-d and a support layer 3803 of the seat. The space layer 3801a-d can be positioned within recesses formed in the support layer 3803. In some embodiments, a comfort layer, such as the comfort layer 3955 discussed below with respect to FIGS. 39A and 39B, may be placed above the flexible members 3804a-d and the spacer layer 3801a-d. The spacer layer 3801a-d can be configured to allow air to flow laterally and upwardly through the structure while maintaining a space between two surfaces, such as the support layer 3803 and the trim/cover layer, which may comprise both an outer trim layer and a comfort/smoothing layer as discussed above with respect to FIGS. 17A and 17B. The spacer layer can be formed of a variety of materials such as a honey-combed foam material, material with channels and passages formed therein, 3D spacer fabrics, mesh netting fabrics, spacing plates, etc. As an example, one preferred material is sold under the trade name 3MESH® and is commercially available from Mueller Textil GmbH, Germany or Mueller Textiles, Inc., Rhode Island, USA. Other preferred spacing devices and spacing plates are disclosed in U.S. Pat. No. 8,777,320, the entirety of which is incorporated by reference herein in its entirety. The channels 3814a and 3814b may fluidly connect to channels 3876 and 3872 that are part of a manifold system mounted to the bottom of the seat pan, as illustrated in more detail in FIG. 40.

Figure 39A:
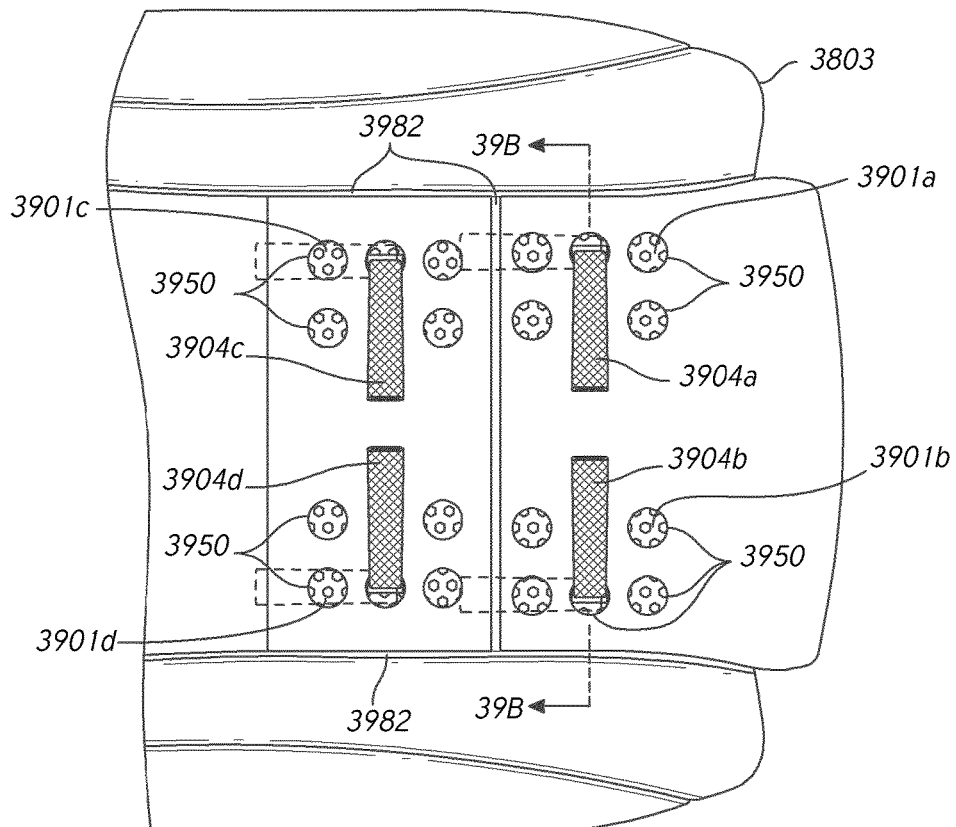
FIGS. 39A and 39B further illustrate the embodiment shown in FIGS. 38A and 38B with FIG. 39A being a top view of a seat control system and FIG. 39B being a cross-sectional view through FIG. 39A.
Figure 39B:
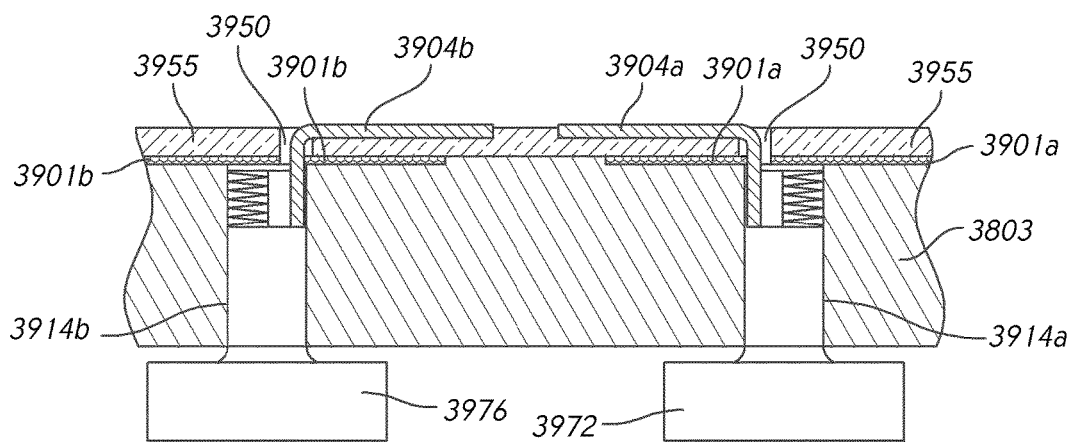

FIGS. 39A and B illustrate a configuration as in FIGS. 38A and 39B that also includes a second comfort layer 3955. The second comfort layer 3955 restricts airflow into the climate control assembly to specific locations, such as openings 3950. The second comfort layer 3955 is located between the flexible conductive members 3904a-d and the spacer layer 3901a-d below. The second comfort layer 3955 can comprises two or more pieces of comfort foam defining a gap or channel 3982 between them. The gap or channel 3982 can allow a trim layer, such as trim layer 1701 discussed above with respect to FIGS. 17A and 17B, to be secured directly to the support layer 3803 beneath. The openings 3950 in the second comfort layer 3955 direct airflow through specified channels, such as channels 3914a, 3914b in the seat assembly. These channels may be connected to a manifold system, such as the system 4000 illustrated in FIG. 40. In the embodiments described herein, the trim layer or top layer (e.g., a seat covering material such as upholstery, leather, cloth) and/or an intermediate layer can be made of air permeable material and/or can be perforated or otherwise formed with holes and/or passages for allowing the flow of air there-through such that air can flow through the trim or top later and the intermediate layer into the channel or channels.

The conductive members 3904a-d can be located in areas where the occupant contacts the seat and can extend towards each other as shown in FIGS. 39A and 39B or longitudinally as illustrated by the dotted lines. A distribution or spacer layers 3901a-d, as discussed above, can overlap the respective conductive members 3904a-d in areas of contact with the occupant. The distribution or spacer layer can also extend into areas adjacent to areas where the occupant contacts the seat to draw air around the occupant and into the seat.

As illustrated in FIG. 39B, the second comfort layer 3955 may include recesses in which the conductive members 3904 are partially (as shown) or fully recessed such that the top of the conductive members 3904 are flush with the top surface of the second comfort layer 3955. Alternatively, the conductive members 3904 may not be placed within recesses in the second comfort layer 3955. While FIG. 39B illustrates a space between the heat exchanger coupled to the waste side of the thermoelectric device, in other embodiments the heat exchanger may abut or extend above the distribution or spacer layer 3901 to minimize the length of the conductive member 3904.

Figure 40:
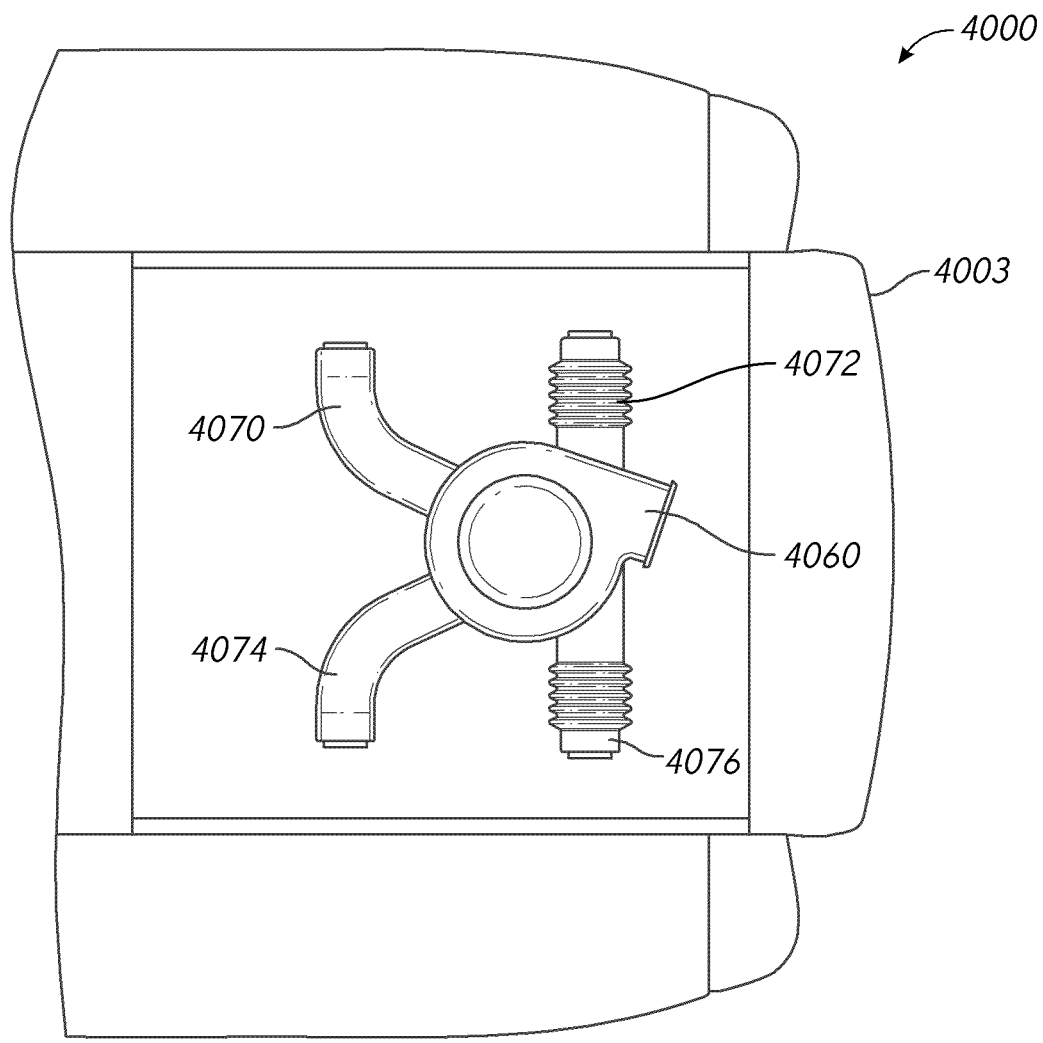
FIG. 40 illustrates an embodiment of a manifold system for a seat climate control system according to the present disclosure.

FIG. 40 illustrates a manifold system 4000 that is attached to a seat pan of a seat assembly 4003 from below. The manifold system 4000 couples a single fan or blower 4060 to multiple channels 4070, 4072, 4074, 4076 or thermoelectric devices. The manifold system 4000 can draw air from the surface adjacent to the user, through the climate controlled seat assembly via the channels as illustrated in FIGS. 38A, 38B, 39A, 39B.

As discussed above, the flexible conductive member may comprise copper mesh or copper braid material. These materials are advantageous as they have high thermal conductivity and may be soldered directly to a copper connection on the thermoelectric device. However, in other embodiments, other conductive materials, such as aluminum mesh or braid or graphite or graphone may be used for the flexible conductive members.

To assist in the description of the disclosed embodiments, words such as upward, upper, downward, lower, vertical, horizontal, upstream, and downstream have been used above to describe the accompanying figures. It will be appreciated, however, that the illustrated embodiments can be located and oriented in a variety of desired positions.

In the above description, various components are described as being associated with the "back" or "seat" cushion. In modified embodiments, it should be appreciated that the subcomponents of the back and seat cushions may be reversed and/or made to the same. In still other embodiments, the various components of the illustrated embodiments may be combined and/or may be applied to different zones of a seat, such as, for example, a top and bottom portion of a backrest portion. In other embodiments, the features of the back and seat cushions may be applied to different zones of an occupant area that are to be thermally conditioned, such as, for example, back and rear seat assemblies or left and right seat assemblies.

Although several embodiments and examples are disclosed herein, the present application extends beyond the specifically disclosed embodiments to other alternative embodiments and/or uses of the inventions and modifications and equivalents thereof. It is also contemplated that various combinations or subcombinations of the specific features and aspects of the embodiments may be made and still fall within the scope of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above, but should be determined only by a fair reading of the claims that follow.

While the embodiments disclosed herein are susceptible to various modifications, and alternative forms, specific examples thereof have been shown in the drawings and are herein described in detail. It should be understood, however, that the inventions are not to be limited to the particular forms or methods disclosed, but, to the contrary, the inventions are to cover all modifications, equivalents, and alternatives falling within the spirit and scope of the various embodiments described and the appended claims. Any methods disclosed herein need not be performed in the order recited. The methods disclosed herein include certain actions taken by a user; however, they can also include any third-party instruction of those actions, either expressly or by implication. For example, actions such as "directing" or "activating" include "instructing directing" or "instructing activating," respectively. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers. For example, "about 10 mm" includes "10 mm." Terms or phrases preceded by a term such as "substantially" include the recited term or phrase. For example, "substantially parallel" includes "parallel."

Although the foregoing description of the preferred embodiments has shown, described, and pointed out certain novel features, it will be understood that various omissions, substitutions, and changes in the form of the detail of the apparatus as illustrated, as well as the uses thereof, may be made by those skilled in the art without departing from the spirit of this disclosure. Consequently, the scope of the present inventions should not be limited by the foregoing discussion, which is intended to illustrate rather than limit the scope of the inventions.

What is claimed is:

1. A climate controlled assembly, comprising:
   a support member having a support surface configured to support an occupant;
   a blower configured to draw air adjacent the support surface of the support member;
   a thermoelectric device disposed on the support member and including a main side and a waste side, the main side configured to provide heating or cooling to the support surface;
   a heat exchanger conductively coupled to the waste side of the thermoelectric device; and
   a conductive member conductively coupled to the main side of the thermoelectric device, at least a portion of the conductive member extending along the support surface of the support member, wherein
   during operation, the blower draws air adjacent the support surface at the same time the thermoelectric device cools the conductive member.

2. The climate controlled assembly of claim 1 further comprising a channel within the support member, the channel extending from the support surface through a portion of the support member, wherein the blower is configured to withdraw air adjacent the support surface of the support member into the channel.

3. The climate controlled assembly of claim 2, wherein the thermoelectric device and the heat exchanger are positioned at least partially within the channel.

4. The climate controlled assembly of claim 2 further comprising a recess, a comfort layer, and a permeable member, the recess positioned within the support member between the support surface and the channel, the permeable member positioned within the recess, the comfort layer positioned on the support surface of the support member, wherein the conductive member is positioned between the permeable member and the comfort layer.

5. The climate controlled assembly of claim 1, wherein the support member is a seat for a vehicle or a bed.

6. The climate controlled assembly of claim 1 further comprising a comfort layer and a trim layer covering the support surface of the support member.

7. The climate controlled assembly of claim 6, wherein the conductive member extends along the support surface of the support member below the comfort layer.

8. The climate controlled assembly of claim 1 further comprising an intermediate member conductively coupled to the conductive member and to the main side of the thermoelectric device.

9. The climate controlled assembly of claim 8, wherein the intermediate member comprises at least two prongs, wherein the conductive member is conductively coupled to one of the at least two prongs and an other conductive member is conductively coupled to one other of the at least two prongs.

10. The climate controlled assembly of claim 9, wherein each of the at least two prongs extend into the associated conductive member.

11. The climate controlled assembly of claim 1, wherein the air is drawn through the support surface of the support member.

12. The climate controlled assembly of claim 11, wherein the blower is configured to draw air across the heat exchanger, and wherein the air drawn across the heat exchanger is the same air that is drawn through the support surface of the support member.

13. The climate controlled assembly of claim 1, wherein the air drawn adjacent the support surface of the support member is directed at last in part laterally within the support member along the support surface.

14. The climate controlled assembly of claim 1, wherein air drawn adjacent the support surface is drawn from a side surface of the support member.

15. The climate controlled assembly of claim 1 further comprising a channel extending through a portion of the support member, the channel configured to direct air from adjacent the support surface through the portion of the support member, wherein the channel is positioned along a side surface of the support member.

16. The climate controlled assembly of claim 15, wherein the channel is configured to direct air from adjacent the support surface to the heat exchanger such that the air drawn across the heat exchanger is the same air that is drawn adjacent the support surface.

17. The climate controlled assembly of claim 1 further comprising a first fluid zone and a second fluid zone, the first fluid zone including the thermoelectric device, the heat exchanger, and the conductive member, wherein the blower is configured to draw air adjacent the support surface in the first fluid zone, and wherein at least part of the air drawn adjacent the support surface is directed through the second fluid zone and not through the first fluid zone.

18. The climate controlled assembly of claim 1, wherein the conductive member is configured to conductively direct thermal energy from the main side of the thermoelectric device to the support surface of the support member.

19. The climate controlled assembly of claim 1, wherein the blower is configured to draw air from adjacent the support surface to the heat exchanger coupled to the waste side of the thermoelectric device.

20. The climate controlled assembly of claim 1, wherein the conductive member longitudinally extends from the main side of the thermoelectric device in a first direction and longitudinally extends along the support surface of the support member in a second direction different from the first direction.

21. A method for thermally conditioning a support assembly that includes a support structure that defines a support surface, the method comprising:
  operating a thermoelectric device, the thermoelectric device including a main side and a waste side, the main side configured to provide heating or cooling to the support surface;
  drawing air from adjacent the support surface through a heat exchanger conductively coupled to the waste side of the thermoelectric device;
  cooling, using the thermoelectric device, a conductive member conductively coupled to the main side of the thermoelectric device and located adjacent the support surface; and
  conductively cooling the support surface by simultaneously performing the steps of drawing air from adjacent the support surface and cooling the conductive member to provide both convective and conductive conditioning at the support surface.

22. The method of claim 21, wherein the conductive member is a flexible conductive member that extends along the support surface.

23. A climate control device, comprising:
  a thermoelectric device having a main side and a waste side, the thermoelectric device configured to heat or cool air;
  a first heat exchanger defining a flow path adjacent the waste side of the thermoelectric device and conductively coupled to the waste side of the thermoelectric device; and
  a flexible first conductive member extending beyond the thermoelectric device and conductively coupled to the main side of the thermoelectric device, the main side of the thermoelectric device configured to heat or cool the flexible first conductive member,
  wherein the first heat exchanger is in fluid communication with the flexible first conductive member via the flow path.

24. The climate control device of claim 23, wherein the first conductive member is a flexible woven material.

25. The climate control device of claim 23, wherein a length of the first conductive member is at least 50 mm.

26. The climate control device of claim 23 further comprising an intermediate conductive member, wherein the flexible first conductive member is coupled to the intermediate conductive member and the intermediate conductive member is coupled to the thermoelectric device.

27. The climate controlled assembly of claim 23, further comprising a second conductive member extending beyond the thermoelectric device and conductively coupled to the main side the thermoelectric device.

28. The climate controlled assembly of claim 23, wherein the first conductive member is a flexible metal mesh.

* * * * *

UNITED STATES PATENT AND TRADEMARK OFFICE
CERTIFICATE OF CORRECTION

| | |
|---|---|
| PATENT NO. | : 10,219,323 B2 |
| APPLICATION NO. | : 15/118441 |
| DATED | : February 26, 2019 |
| INVENTOR(S) | : Masahiko Inaba et al. |

Page 1 of 1

It is certified that error appears in the above-identified patent and that said Letters Patent is hereby corrected as shown below:

On the Title Page

Item (73), Assignee, change "GENTHREM" to --GENTHERM--.

Signed and Sealed this
Thirty-first Day of March, 2020

Andrei Iancu
*Director of the United States Patent and Trademark Office*